United States Patent
Zhou et al.

(10) Patent No.: US 12,492,190 B2
(45) Date of Patent: Dec. 9, 2025

(54) POLYDENTATE ORGANIC LIGAND, METALLO-SUPRAMOLECULAR POLYMER, POLYMER FILM AND PREPARATION METHOD THEREOF

(71) Applicant: Jilin University, Changchun (CN)

(72) Inventors: Hongwei Zhou, Changchun (CN); Yuqi Wu, Changchun (CN); Daming Wang, Changchun (CN); Bing Cong, Changchun (CN); Xiaogang Zhao, Changchun (CN); Chunhai Chen, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 18/661,628

(22) Filed: May 12, 2024

(65) Prior Publication Data
US 2025/0236606 A1  Jul. 24, 2025

(30) Foreign Application Priority Data
May 19, 2023 (CN) .......................... 202310572390.9

(51) Int. Cl.
| | | |
|---|---|---|
| C07D 401/14 | (2006.01) | |
| C07C 209/72 | (2006.01) | |
| C07D 213/38 | (2006.01) | |
| C07F 5/02 | (2006.01) | |

(52) U.S. Cl.
CPC .......... C07D 401/14 (2013.01); C07C 209/72 (2013.01); C07D 213/38 (2013.01); C07F 5/025 (2013.01)

(58) Field of Classification Search
CPC .................................................... C07D 401/14
See application file for complete search history.

(56) References Cited

PUBLICATIONS

CNIPA, Notification of First Office Action for CN202310572390.9, Apr. 4, 2024.
Jilin University (Applicant), Reply to Notification of First Office Action for CN202310572390.9, w/ (allowed) replacement claims, Apr. 19, 2024.
CNIPA, Notification to grant patent right for invention in CN202310572390.9, Apr. 26, 2024.

*Primary Examiner* — Brian E McDowell
(74) *Attorney, Agent, or Firm* — Zhigang Ma

(57) ABSTRACT

A polydentate organic ligand has a triphenylamine-pyridine substituted triazole structure with the structural formula I. The polydentate organic ligand having the triphenylamine-pyridine substituted triazole structure and the metal ion are coordinated and driven to synthesize a series of metallo-supramolecular polymers, and the prepared metallo-supramolecular polymers have stable electroactivity, rapid color-switching speeds, and excellent electrochromic performance.

6 Claims, 3 Drawing Sheets

POLYDENTATE ORGANIC LIGAND, METALLO-SUPRAMOLECULAR POLYMER, POLYMER FILM AND PREPARATION METHOD THEREOF

TECHNICAL FIELD

The disclosure belongs to the technical field of organic luminescent materials, and in particular to a polydentate organic ligand having a triphenylamine-pyridine substituted triazole structure, a metallo-supramolecular polymer, and a preparation method thereof.

BACKGROUND

Metallo-supramolecular polymer, also known as supramolecular coordination polymer, is a new type of functional polymer with a variety of geometric structures and topologies, formed by the coordination interaction between metal ions and ligands. The metallo-supramolecular polymer exhibits reversible electrochromic behavior through the electrochemical oxidation-reduction of metal ions, which trigger charge transfer between the metal ions and the ligands, changes in the intensity of metal ion d-d* transitions, or intervalence charge transfer. Electrochromic materials based on metallo-supramolecular polymers combine simple and inexpensive inorganic metal precursors with widely available and easily adjustable organic molecules, they not only create dynamic systems with a variety of colors but also possess superior electrochromic performance.

Triphenylamine in its neutral state is colorless, and the electron-rich triphenylamine is easily oxidized to form a stable cationic radical, which is an excellent electroactive group. The ease of oxidation and hole-transporting ability of the triphenylamine unit endow it with excellent electrochromic properties and a relatively fast electron transfer rate. At the same time, the triphenylamine group has a propeller-like spatial configuration, and its bulky three-dimensional twisted structure not only provides good solubility to the material but also weakens the solid-state π-π stacking effect. Introducing the triphenylamine structure into the metallo-supramolecular polymers can enhance the polymer's solubility in many aprotic solvents, thereby increasing the material's processability.

Triazole compounds have a wide range of applications in fields such as biomedicine, optoelectronics, and chemical engineering. The triazole ring incorporates coordination characteristics of both imidazole and pyridine, forming an electron-rich six-electron pentatomic system that can constitute a rich electron π-conjugated system, which is conducive to intermolecular electron transfer. In addition, the triazole structure can interact with a variety of non-covalent bonds, exhibiting high coordination flexibility and a rich coordination mode, making it an excellent ligand for the synthesis and construction of novel structures. Pyridine-type ligands have strong coordination abilities and are also good chromophores. Introducing a strong electron-withdrawing pyridine substituent into the triazole system can narrow the optical bandgap of the polymer, causing a redshift in the polymer's optical absorption, which is beneficial for expanding the material's electrochromic performance in the near-infrared region. This leads to the creation of a new type of excellent ligand, that is, pyridine substituted triazole.

Nannan Jian et al. (Nannan Jian et al., Highly fluorescent triazolopyridine-thiophene D-A-D oligomers for efficient pH sensing both in solution and in the solid state, physical chemistry chemical physics, 2019, 21, 7174-7182) proposed an electrochromic material containing a pyridine triazole structure, but it has several drawbacks such as low optical contrast in the visible light region, longer response times, and poor electrochemical oxidation-reduction stability of the polymer film, which is not conducive to practical applications. Liu Yingliang et al. (Liu Yingliang et al., electroluminescence properties of hyperbranched polymers by alternating copolymerization of benzylidene-benzotriazole, China symposium on polymer academic papers, 2015) also proposed a hyperbranched electrochromic polymer with an alternating copolymer of triphenylamine-benzotriazole, but tests showed that the material's fluorescence lifetime was not satisfactory.

SUMMARY

Considering the aforementioned issues, an objective of the disclosure is to provide a polydentate organic ligand having a triphenylamine-pyridine substituted triazole structure, a metallo-supramolecular polymer, and a preparation method thereof. The polydentate organic ligand provided by the disclosure, through coordinating with metal ions in a coordination-driven process, synthesizes a series of metallo-supramolecular polymers that possess stable electroactivity, rapid color-switching speeds, and excellent electrochromic performance.

In order to achieve the above objective, the disclosure provides the technical solutions as follows.

A polydentate organic ligand having a triphenylamine-pyridine substituted triazole structure, and the triphenylamine-pyridine substituted triazole structure is expressed by the following Formula I:

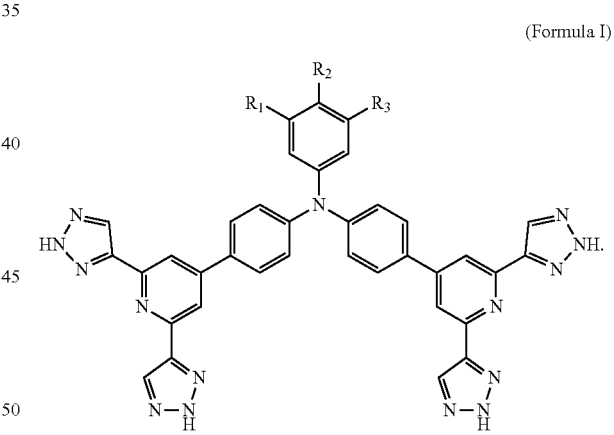

(Formula I)

In the Formula I, each of $R_1$, $R_2$, and $R_3$ is one selected from the group consisting of the following structural formulas:

*—$OCH_3$, *—$CH_3$, *—$C_2H_5$, *—$C_3H_7$, *—$C_4H_9$, *—$NO_2$, *—$CN$, *—$C\equiv CH$, *—H,

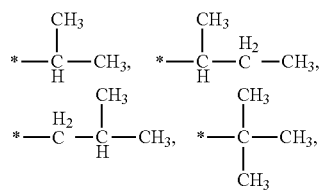

-continued

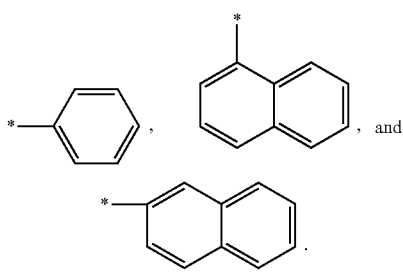

The disclosure further provides a preparation method of the polydentate organic ligand as described in the above technical solution; and the preparation method includes the following steps 1) to 5):

step 1) under an alkaline condition, performing a Ullmann reaction with bis(4-bromophenyl)amine (with a molecular formula of $C_{12}H_9Br_2N$) and an iodobenzene compound, catalyzed by cuprous iodide (with a molecular formula of CuI) and 1,10-phenanthroline (with a molecular formula of $C_{12}H_8N_2$), to obtain a compound A;

step 2) under an alkaline condition, performing a Suzuki reaction with the compound A and bis(pinacolto)borane (with a molecular formula of $C_{12}H_{24}B_2O_4$), catalyzed by [1,1'-bis(diphenylphosphino)ferrocene]dichloropalladium(II) (with a molecular formula of $C_{34}H_{28}Cl_2FeP_2Pd$), to obtain a compound B;

step 3) under an alkaline condition, performing a Suzuki reaction with the compound B and 2,6-dibromo-4-iodopyridine (with a molecular formula of $C_5H_2Br_2IN$), catalyzed by tetrakis(triphenylphosphine)palladium (with a molecular formula of $C_{72}H_{60}P_4Pd$), to obtain a compound C;

step 4) under an alkaline condition, performing a Suzuki reaction with 4-bromo-2h-1,2,3-triazole (with a molecular formula of $C_2H_2BrN_3$) and bis(pinacolto)borane, catalyzed by [1,1'-bis(diphenylphosphino)ferrocene]dichloropalladium(II), to obtain a compound D; and step 5) under an alkaline condition, performing a Suzuki reaction with the compound D and compound C, the catalyzed by tetrakis(triphenylphosphine)palladium, to obtain a target product.

The compound A has the following structural formula:

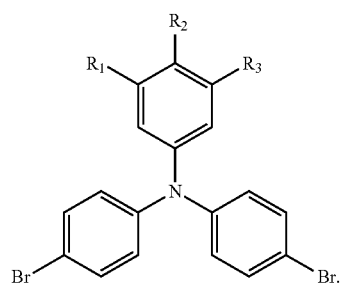

The compound B has the following structural formula:

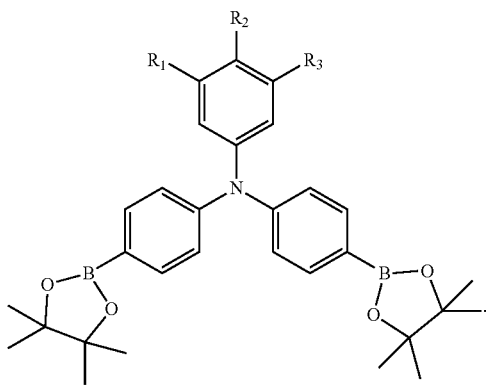

The compound C has the following structural formula:

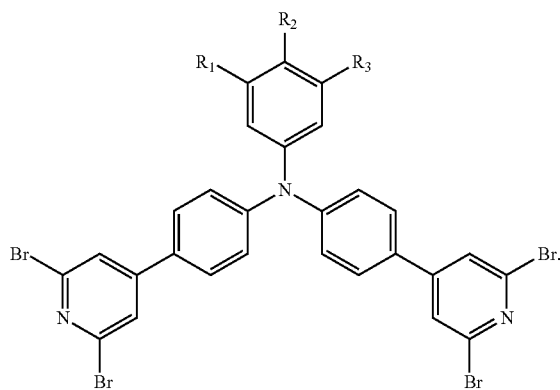

The compound D has the following structural formula:

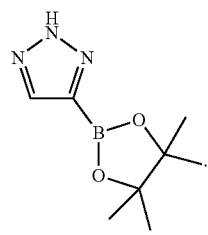

In an embodiment, in the step 1), an alkali of the alkaline condition used for the Ullmann reaction is potassium hydroxide (with a molecular formula of KOH), a molar ratio of the bis(4-bromophenyl)amine:the iodobenzene compound:the cuprous iodide:the 1,10-phenanthroline:the potassium hydroxide is 1:1 to 3:0.04 to 0.06:0.04 to 0.06:6 to 10; a temperature of the Ullmann reaction is in a range of 100° C. to 130° C.; and a time of the Ullmann reaction is in a range of 10 h to 40 h.

In an embodiment, in the step 2), an alkali of the alkaline condition used for the Suzuki reaction is one selected from the group consisting of potassium acetate (with a molecular formula of $C_2H_3KO_2$), sodium carbonate (with a molecular formula of $Na_2CO_3$), lithium carbonate (with a molecular formula of $Li_2CO_3$) and potassium phosphate (with a molecular formula of $K_3PO_4$); a molar ratio of the compound A: the bis(pinacolto)borane:the alkali:the [1,1'-bis(diphenylphosphino)ferrocene]dichloropalladium(II) is 1:1.5 to 5:6 to 9:0.04 to 0.06; a temperature of the Suzuki reaction is in a range of 80° C. to 100° C.; and a time of the Suzuki reaction is in a range of 12 h to 48 h.

In an embodiment, in the step 3), an alkali of the alkaline condition used for the Suzuki reaction is potassium carbonate (with a molecular formula of $K_2CO_3$); a molar ratio of the compound B: the 2,6-dibromo-4-iodopyridine:the tetrakis(triphenylphosphine)palladium:the potassium carbonate is 1:1.5 to 5:0.04 to 0.06:6 to 9; a temperature of the Suzuki reaction is in a range of 50° C. to 80° C.; and a time of the Suzuki reaction is in a range of 18 h to 48 h.

In an embodiment, in the step 4), an alkali of the alkaline condition used for the Suzuki reaction is one selected from the group consisting of potassium acetate, sodium carbonate, lithium carbonate and potassium phosphate; a molar ratio of the 4-bromo-2h-1,2,3-triazole:the bis(pinacolto)borane:the alkali:the [1,1'-bis(diphenylphosphino)ferrocene]dichloropalladium(II) is 1:1.5 to 5:6 to 9:0.04 to 0.06; a temperature of the Suzuki reaction is in a range of 80° C. to 100° C.; and a time of the Suzuki reaction is in a range of 12 h to 48 h.

In an embodiment, in the step 5), an alkali of the alkaline condition used for the Suzuki reaction is potassium carbonate; a molar ratio of the compound D:the compound C:the tetra(triphenylphosphine)palladium:the potassium carbonate is 1:1.5 to 5:0.04 to 0.06:6 to 9; a temperature of the Suzuki reaction is in a range of 50° C. to 80° C.; and a time of the Suzuki reaction is in a range of 18 h to 48 h.

The disclosure further provides a metallo-supramolecular polymer, synthesized by coordination-driven between the polydentate organic ligand and a metal ion.

In an embodiment, a reaction temperature of the coordination-driven between the polydentate organic ligand and the metal ion is in a range of 50° C. to 90° C., and a reaction time of the coordination-driven between the polydentate organic ligand and the metal ion is in a range of 12 h to 48 h.

The disclosure further provides a metal ion-ligand supramolecular polymer film, the metallo-supramolecular polymer is dissolved in methanol to obtain a solution, and the solution is sprayed on a surface of an indium tin oxide (ITO) conductive glass, and then the sprayed solution is dried to obtain the metal ion-ligand supramolecular polymer film.

Compared with the related art, the disclosure has the following beneficial technical effects.

The disclosure provides the polydentate organic ligand including the triphenylamine-pyridine substituted triazole structure, which, through coordination-driven with metal ions, facilitates the synthesis of a series of metallo-supramolecular polymers. The metallo-supramolecular polymers exhibit stable electroactivity, rapid color transition speeds, and excellent electrochromic performance.

DETAILED DESCRIPTION OF EMBODIMENTS

Figure 1:
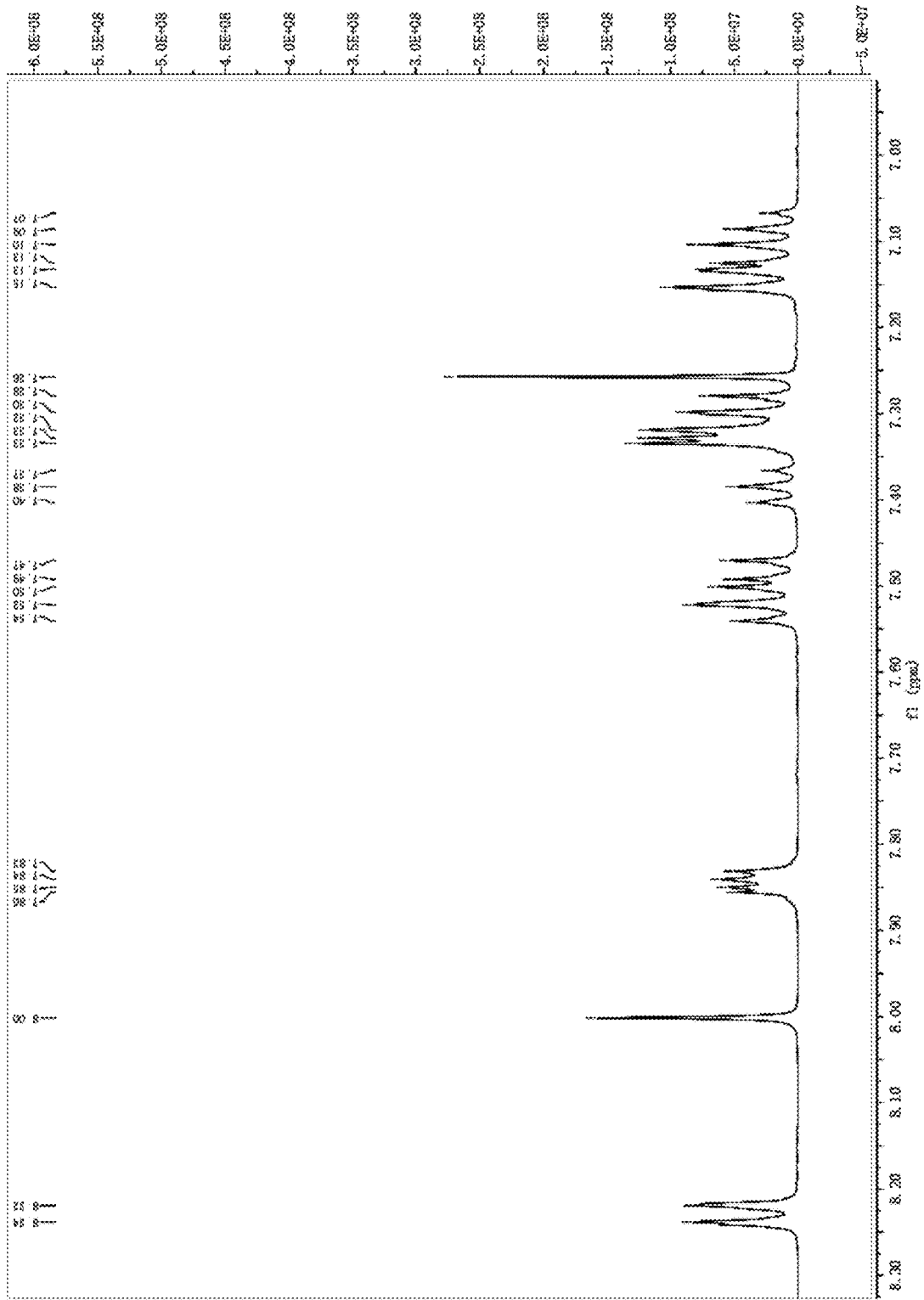
FIG. 1 illustrates a hydrogen nuclear magnetic resonance (NMR) spectrum of a target product of 4-(2,6-di(2H-1,2,3-triazol-4-yl) pyridin-4-yl)-N-(2,6-di(2H-1,2,3-triazol-4-yl) pyridin-4-yl)phenyl)-N-phenylaniline according to an embodiment 1 of the disclosure.

The disclosure provides a polydentate organic ligand including a triphenylamine-pyridine substituted triazole structure with the Formula I as follows:

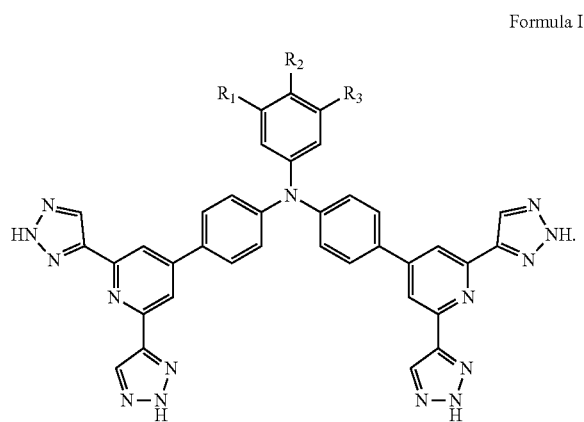

Formula I

In the Formula I, each of $R_1$, $R_2$, and $R_3$ is one selected from the group consisting of the following structural formulas:

*—$OCH_3$, *—$CH_3$, *—$C_2H_5$, *—$C_3H_7$, *—$C_4H_9$, *—$NO_2$, *—$CN$, *—$C\equiv CH$, *—H,

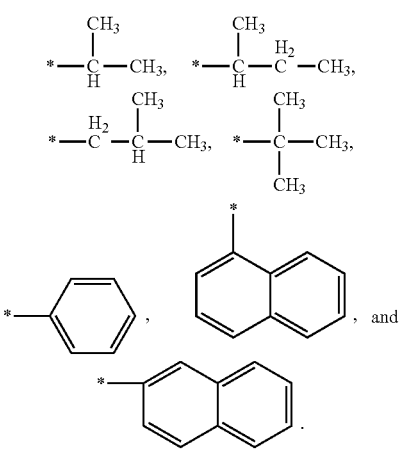

The disclosure further provides a preparation method of the polydentate organic ligand as the above technical solution, including the following steps 1) to 5).

Step 1) under an alkaline condition, bis(4-bromophenyl)amine and an iodobenzene compound undergo a Ullmann reaction, catalyzed by cuprous iodide and 1,10-enanthroline, to obtain a compound A; and the step 1) is expressed by the chemical equation as follows:

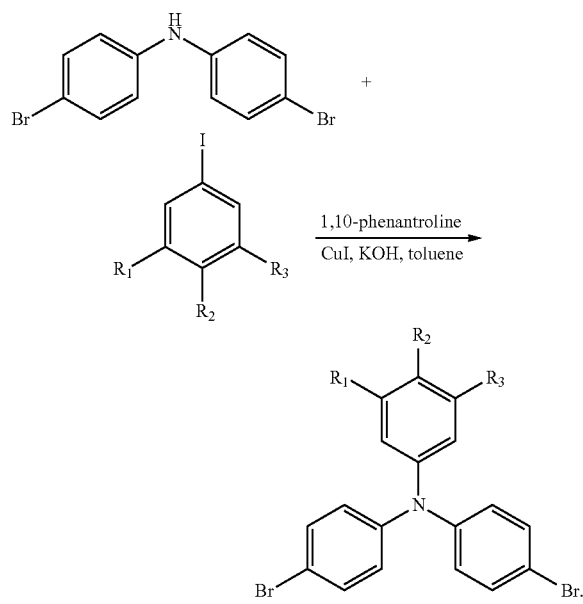

In some embodiments, the specific operation of the Ullmann reaction includes the following steps: the bis(4-bromophenyl)amine, the iodobenzene compound and an alkali are added into a Schlank bottle, then the cuprous iodide and the 1,10-phenanthroline are added into the Schlank bottle, followed by applying three nitrogen-vacuum cycles to a system in the Schlank bottle. After the solid reactants in the Schlank bottle are fully soaked in nitrogen atmosphere, a solvent is added into the Schlank bottle by a syringe, and then three nitrogen-vacuum cycles are applied to the system in the Schlank bottle again, so that the system reacts at 100-130° C. for 10-40 h. After the reaction is completed, a proper amount of saturated salt water is added into the Schlank bottle to demulsify, then dichloromethane (with a molecular formula of $CH_2Cl_2$) is added into the Schlank bottle to extract the obtained product for many times, the obtained organic phases are combined and then dried with anhydrous sodium sulfate (with a molecular formula of $Na_2SO_4$), the anhydrous sodium sulfate is removed by filtering, the organic solvent dichloromethane in the filtrate is evaporated under reduced pressure, dichloromethane/petroleum ether is used as eluent to purify the crude product by chromatographic column to obtain the compound A.

In the embodiment, the operation of the three nitrogen-vacuum cycles is as follows: firstly, the Schlank bottle is filled with nitrogen by using double-row tubes, and then vacuum of the Schlank bottle is pumped until the vacuum degree reaches below 0.1 MPa, and the above operation is repeated for three cycles to ensure that the reaction is carried out in the nitrogen atmosphere. In the embodiment, a molar ratio of the bis(4-bromophenyl)amine:the iodobenzene compound:the cuprous iodide:the 1,10-phenanthroline:the alkali is 1:1-3:0.04-0.06:0.04-0.06:6-10. The alkali is preferably potassium hydroxide. In the embodiment, the solvent is anhydrous toluene, an addition amount of the anhydrous toluene is controlled to be 1 mmol of bis(4-bromophenyl) amine monomer per 1-5 ml of anhydrous toluene. A volume ratio of the dichloromethane to the saturated saline solution is 2:2-1. A volume ratio of dichloromethane to petroleum ether in the eluent of dichloromethane/petroleum ether is 2-10:1.

Step 2) under an alkaline condition, the compound A and bis(pinacolto)borane undergo a Suzuki reaction, catalyzed by [1,1'-bis(diphenylphosphino)ferrocene]dichloropalladium(II) (hereinafter referred to as $Pd(dppf)Cl_2$), to obtain a compound B; and the step 2) is expressed by the chemical equation as follows:

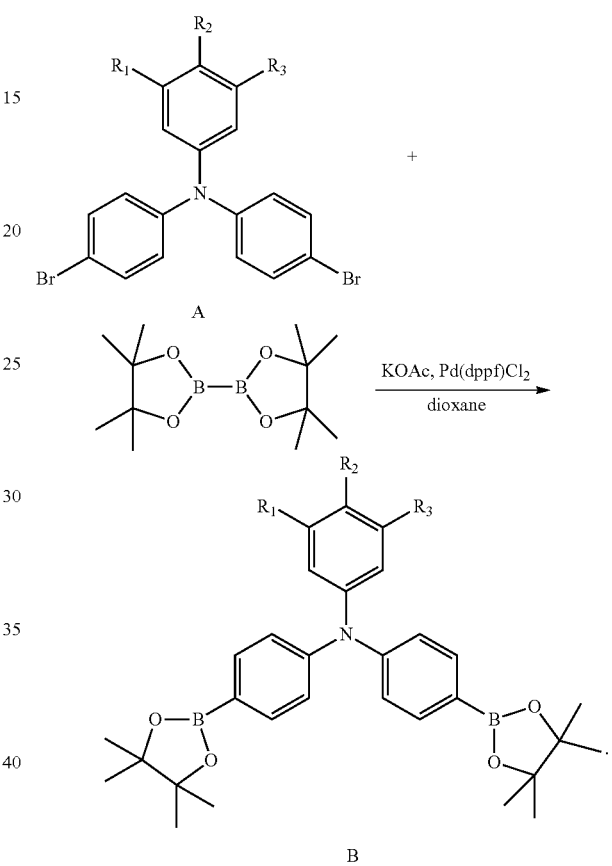

In some embodiment, the specific operation of the Suzuki reaction in the step 2) is as follows: the compound A, the bis(pinacolto)borane, an alkali and the $Pd(dppf)Cl_2$ are added into a Schlank flask, followed by applying three nitrogen-vacuum cycles to the system in the Schlank flask; then a solvent is added into the Schlank flask by using a syringe, followed by applying three nitrogen-vacuum cycles to the system in the Schlank flask again, and the system reacts for 12-48 hours at 80-100° C. in nitrogen atmosphere. After the reaction, the product is extracted with dichloromethane and water for many times, and the obtained organic phases are combined and dried with anhydrous sodium sulfate, the anhydrous sodium sulfate is removed by filtering, and the dichloromethane in the filtrate is removed by rotary evaporation to obtain the compound B.

In the embodiment, a molar ratio of the compound A: the bis(pinacolto)borane:the alkali:the $Pd(dppf)Cl_2$ is 1:1.5 to 5:6 to 9:0.04 to 0.06. The alkali is one selected from the group consisting of potassium acetate (hereinafter referred to as KOAc), sodium carbonate, lithium carbonate and potassium phosphate. The solvent is 1,4-dioxane, and an addition amount of the 1,4-dioxane is controlled to be 1 mmol of 4,4'-dibromotriphenylamine per 10 ml of 1,4-dioxane. The volume ratio of dichloromethane to water is 2:2-1.

Step 3) under an alkaline condition, the compound B and 2,6-dibromo-4-iodopyridine undergo a Suzuki reaction, catalyzed by tetrakis(triphenylphosphine)palladium (hereinafter referred to as Pd(pph$_4$)$_3$), to obtain a compound C; and the step 3) is expressed by the chemical equation as follows:

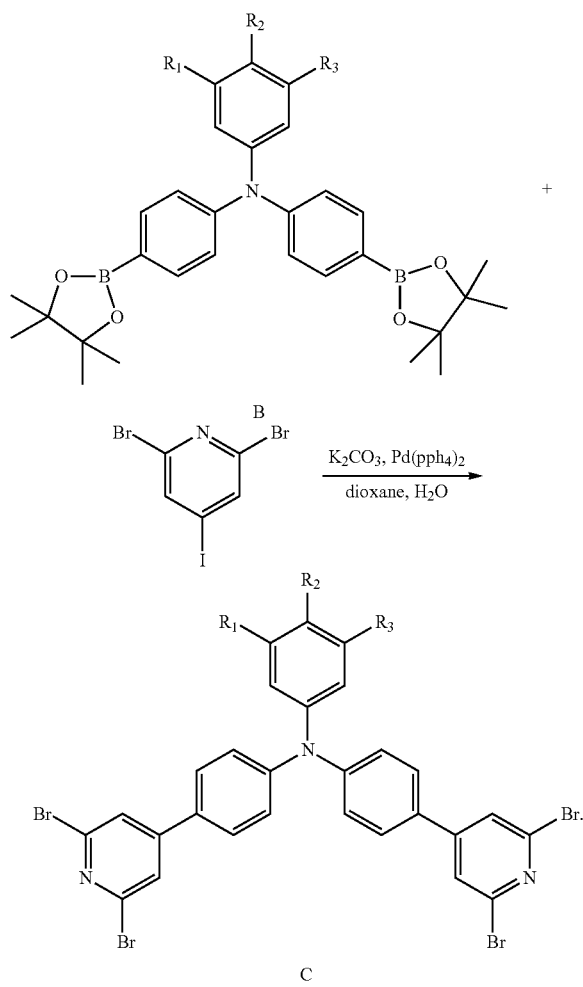

C

In some embodiment, the specific operation of the Suzuki reaction in the step 3) is as follows: the compound B, the 2,6-dibromo-4-iodopyridine, the Pd(pph$_4$)$_3$ and an alkali are added into a Schlank flask, followed by applying three nitrogen-vacuum cycles to the system in the Schlank flask; then a solvent is added into the Schlank flask, followed by applying three nitrogen-vacuum cycles to the system in the Schlank flask again, and then the system reacts for 18-48 hours at 50-80° C. in nitrogen atmosphere after the three nitrogen-vacuum cycles. After the reaction, the mixture in the Schlank flask is poured into deionized water, the product is filtered to obtain a filtered product, the filtered product is dried, and then washed with methanol to obtain the compound C.

In the embodiment, a molar ratio of the compound B: the 2,6-dibromo-4-iodopyridine:the tetrakis(triphenylphosphine)palladium:the alkali is 1:1.5 to 5:0.04 to 0.06:6 to 9. The alkali is preferably potassium carbonate. The solvent is a mixed solution of 1,4-dioxane and water, a volume ratio of 1,4-dioxane to water is 3-3.5:1, an addition amount of the 1,4-dioxane is controlled to be 1 mmol of 2,6-dibromo-4-iodopyridine per 10 ml of 1,4-dioxane.

Step 4) under an alkaline condition, 4-bromo-2h-1,2,3-triazole and bis(pinacolto)borane undergo a Suzuki reaction, catalyzed by Pd(dppf)Cl$_2$, to obtain a compound D (i.e., 4-(4,4,5,5-tetramethyl-1,3,2-dioxyboron-2-yl)-2H-1,2,3-triazole); and the step 4) is expressed by the chemical equation as follows:

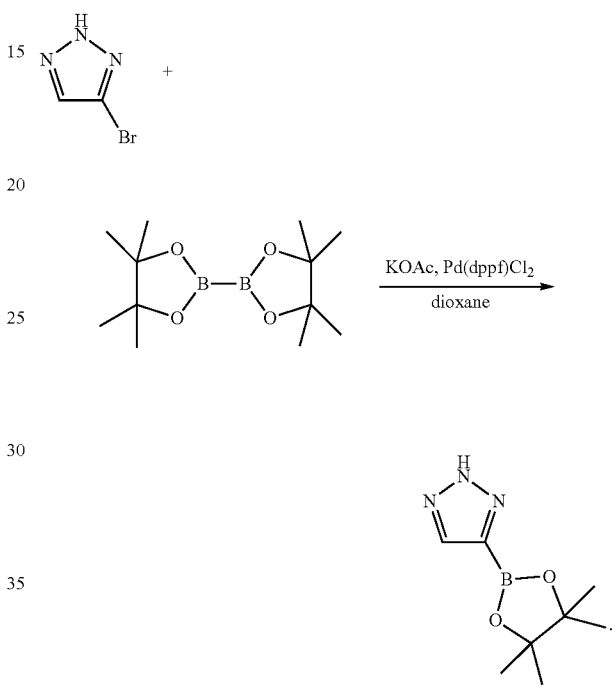

D

In some embodiment, the specific operation of the Suzuki reaction in the step 4) is as follows: the 4-bromo-2h-1,2,3-triazole, the bis(pinacolto)borane, an alkali and the Pd(dppf)Cl$_2$ are added into a Schlank flask, followed by applying three nitrogen-vacuum cycles to the system in the Schlank flask; then a solvent is added into the Schlank flask by using a injector, followed by applying three nitrogen-vacuum cycles to the system in the Schlank flask again, and the system reacts for 12-48 hours at 80-100° C. after the three nitrogen-vacuum cycles. After the reaction, the product is extracted with dichloromethane and water for many times, and the obtained organic phases are combined and dried with anhydrous sodium sulfate, the anhydrous sodium sulfate is removed by filtering and the dichloromethane in the filtrate is rotary evaporated, and then the compound D is obtained.

In the embodiment, a molar ratio of the 4-bromo-2h-1,2,3-triazole:the bis(pinacolto)borane:the alkali:the Pd(dppf)Cl$_2$ is 1:1.5 to 5:6 to 9:0.04 to 0.06. The alkali is one selected from the group consisting of potassium acetate, sodium carbonate, lithium carbonate and potassium phosphate. The solvent is 1,4-dioxane, an addition amount of the 1,4-dioxane is controlled to be 1 mmol of 4-bromo-2h-1,2,3-triazole per 10 ml of the 1,4-dioxane, and a volume ratio of dichloromethane to water is 2:2-1.

Step 5) under an alkaline condition, the compound D and the compound C undergo a Suzuki reaction, catalyzed by tetrakis(triphenylphosphine)palladium, to obtain a target product, that is, the triphenylamine-pyridine substituted triazole compound; and the step 5) is expressed by the chemical equation as follows:

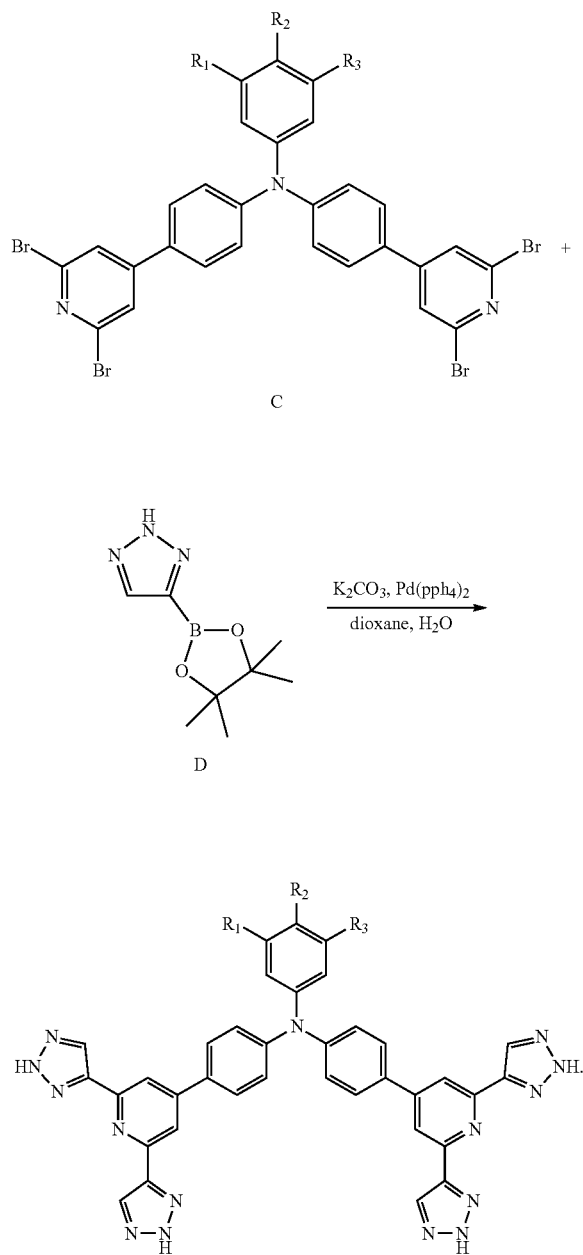

In some embodiment, the specific operation of the Suzuki reaction in the step 5) is as follows: the compound D, the compound C, the tetrakis(triphenylphosphine)palladium and an alkali are added into a Schlank flask, followed by applying three nitrogen-vacuum cycles to the system in the Schlank flask; then a solvent is added into the Schlank flask, followed by applying three nitrogen-vacuum cycles to the system in the Schlank flask again, and the system reacts for 18-48 hours at 50-80° C. after the three nitrogen-vacuum cycles. After the reaction, the mixture in the Schlank flask is discharged into deionized water, the mixture is filtered to obtain a filtered product, the filtered product is dried, and then washed with methanol to obtain the target product, that is, the triphenylamine-pyridine substituted triazole compound.

In the embodiment, a molar ratio of the compound D:the compound C: the tetra(triphenylphosphine)palladium:the alkali is 1:1.5 to 5:0.04 to 0.06:6 to 9. The alkali is potassium carbonate. In the embodiment, the solvent is a mixed solution of 1,4-dioxane and water, a volume ratio of 1,4-dioxane to water is 3-3.5:1, an addition amount of the 1,4-dioxane is controlled to contain 1 mmol of 4-(2,6-dibromopyridine-4-yl)-N-(4-(2,6-dibromopyridine-4-yl)phenyl)-N-phenylaniline per 10 ml of the 1,4-dioxane.

The disclosure further provides a metallo-supramolecular polymer, synthesized by coordination-driven between the aforementioned polydentate organic ligand and a metal ion.

In some embodiments, a molar ratio of the polydentate organic ligand to the metal ion is 1:1-1.5. The metal ion is one selected from the group consisting of $Fe(BF_4)_2 \cdot 6H_2O$, $Cu(ClO_4)_2 \cdot 6H_2O$, $Zn(BF_4)_2 \cdot 6H_2O$ and $RuCl_2(DMSO)_4$. A reaction temperature of the coordination-driven between the polydentate organic ligand and the metal ion is in a range of 50° C. to 90° C., and a reaction time of the coordination-driven between the polydentate organic ligand and the metal ion is in a range of 12 h to 48 h.

In some embodiments, the specific operation of the coordination-driven between the polydentate organic ligand and the metal ion is as follows: the polydentate organic ligand and the metal ion are dissolved in glacial acetic acid, followed by reacting at 50 to 90° C. for 12 to 48 hours, which ensures the complete complexation of the ligand with the metal ion. After the reaction is complete, the mixture is filtered and the filtrate is concentrated by rotary evaporation. The product is then washed multiple times with ethanol and dried under vacuum to obtain the solid metallo-supramolecular polymer. In the embodiment, the addition amount of the glacial acetic acid is 0.1 mmol of polydentate organic ligand per 100 ml of glacial acetic acid.

The disclosure further provides a metal ion-ligand supramolecular polymer film, obtained by dissolving the metallo-supramolecular polymer in methanol to obtain a solution, and spraying the solution on a surface of an ITO conductive glass, and drying the sprayed solution on the surface of the ITO conductive glass.

In some embodiments, the specific operation is as follows: the solid metallo-supramolecular polymer is dissolved in the methanol, followed by filtering out insoluble substances to obtain a metal ion-ligand supramolecular polymer solution, 5 ml-40 ml of the metal ion-ligand supramolecular polymer solution is added into a watering can of a pneumatic pen, followed by spraying it on the surface of the ITO conductive glass and then putting the ITO conductive glass spayed with the solution into a drying box to dry at 30-40° C. for 12-36 h to obtain the uniform metal ion-ligand supramolecular polymer film. In the embodiment, the addition amount of methanol is controlled to be 50 mg of the metallo-supramolecular polymer per 100 ml of methanol.

In order to better understand the disclosure, the contents of the disclosure will be further clarified with embodiments below, but the contents of the disclosure are not limited to the following embodiments.

Embodiment 1

The structure of a polydentate organic ligand is expressed by the following structural formula:

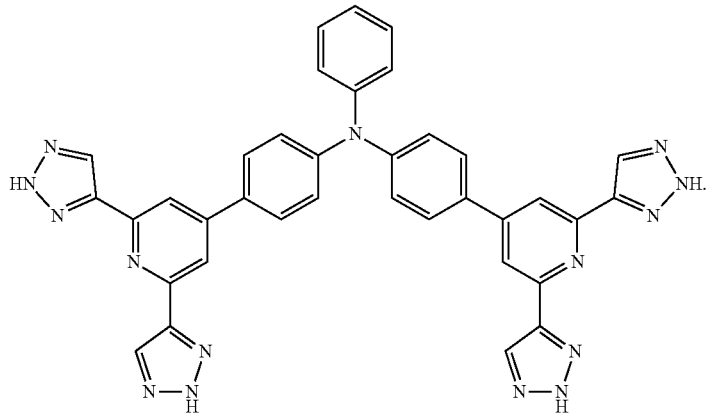 [SMILES: c1ccc(N(c2ccc(-c3cc(-c4cn[nH]n4)nc(-c4cn[nH]n4)c3)cc2)c2ccc(-c3cc(-c4cn[nH]n4)nc(-c4cn[nH]n4)c3)cc2)cc1]

(1) 16.35 g (50.0 mmol) of bis(4-bromophenyl)amine, 10.2 g (50.0 mmol) of iodobenzene (with a molecular formula of $C_6H_5I$), 0.38 mg (2.0 mmol) of cuprous iodide, 0.36 mg (2.0 mmol) of 1,10-phenanthroline, and 16.83 g (0.3 mol) of potassium hydroxide are added into a Schlenk flask, followed by applying three nitrogen-vacuum cycles to the Schlenk flask, and then 50 ml of anhydrous toluene is added into the Schlenk flask as the solvent, followed by applying three nitrogen-vacuum cycles to the Schlenk flask again. The mixture in the Schlenk flask is heated to 110° C. and reacts for 10 hours. After the reaction is complete, the product is extracted with 30 ml of dichloromethane and 30 ml of saturated sodium chloride solution, the organic phases are combined and dried using anhydrous sodium sulfate, and then the solvent is removed by rotary evaporation. The product is purified by column chromatography using a dichloromethane/petroleum ether eluent (with a volume ratio of dichloromethane to petroleum ether of 2:1) to obtain 9.27 g of 4,4'-dibromotriphenylamine, with a yield of 46%.

(2) 9 g (22.3 mmol) of the 4,4'-dibromotriphenylamine, 8.49 g (33.45 mmol) of bis(pinacolto)borane, 14.18 g (133.8 mmol) of sodium carbonate, and 0.65 g (0.89 mmol) of $Pd(dppf)Cl_2$ are added into a Schlenk flask, followed by applying three nitrogen-vacuum cycles to the Schlenk flask, and then 223 ml of 1,4-dioxane is added into the Schlenk flask as the solvent by using a syringe, followed by applying three nitrogen-vacuum cycles to the Schlenk flask again. The reaction in the Schlenk flask is carried out at 80° C. for 12 hours. After the reaction is completed, the product is extracted with 30 ml of dichloromethane and 30 ml of water, and the organic phases are combined and dried with anhydrous sodium sulfate. After rotary evaporation, 5.21 g of 4,4'-diboronic acid pinacol ester triphenylamine is obtained, with a yield of 47%.

(3) 5 g (10 mmol) of the 4,4'-diboronic acid pinacol ester triphenylamine, 5.44 g (15 mmol) of 2,6-dibromo-4-iodopyridine, 8.29 g (60 mmol) of potassium carbonate, and 0.46 g (0.4 mmol) of $Pd(pph_4)_3$ are added into a Schlenk flask, followed by applying three nitrogen-vacuum cycles to the Schlenk flask, and then 100 ml of 1,4-dioxane and 33 ml of water are added into the Schlenk flask as a solvent by using a syringe, followed by applying three nitrogen-vacuum cycles to the Schlenk flask again. The reaction in the Schlenk flask is carried out at 50° C. for 18 hours. After the reaction is completed, the mixture is poured into deionized water, filtered, and dried. The product is then washed with methanol to obtain 3.22 g of 4-(2,6-dibromopyridin-4-yl)-N-(4-(2,6-dibromopyridin-4-yl)phenyl)-N-phen ylaniline, with a yield of 45%.

(4) 7.4 g (50 mmol) of 4-bromo-2h-1,2,3-triazole, 19.04 g (75 mmol) of bis(pinacolto)borane, 31.80 g (0.3 mol) of sodium carbonate, and 1.46 g (2 mmol) of $Pd(dppf)Cl_2$ are added into a Schlenk flask, followed by applying three nitrogen-vacuum cycles to the Schlenk flask, and then 500 ml of 1,4-dioxane is added into the Schlenk flask as the solvent by using a syringe, followed by applying three nitrogen-vacuum cycles to the Schlenk flask again. The reaction in the Schlenk flask is carried out at 80° C. for 12 hours. After the reaction is completed, the product is extracted with 30 ml of dichloromethane and 30 ml of water, and the organic phases are combined and dried with anhydrous sodium sulfate. After rotary evaporation, 4.19 g of 4-(4,4,5,5-tetramethyl-1,3,2-dioxaborolan-2-yl)-2H-1,2,3-triazole is obtained, with a yield of 43%.

(5) 1.23 g (6.3 mmol) of the 4-(4,4,5,5-tetramethyl-1,3,2-dioxaborolan-2-yl)-2H-1,2,3-triazole, 3 g (4.2 mmol) of the 4-(2,6-dibromopyridin-4-yl)-N-(4-(2,6-dibromopyridin-4-yl)phenyl)-N-phen ylaniline, 3.48 g (25.2 mmol) of potassium carbonate, and 0.19 g (0.17 mmol) of tetrakis(triphenylphosphine)palladium are added into a Schlenk flask, followed by applying three nitrogen-vacuum cycles to the Schlenk flask, and then 42 ml of 1,4-dioxane and 14 ml of water are added into the Schlenk flask as the solvent by using a syringe, followed by applying three nitrogen-vacuum cycles to the Schlenk flask again. The reaction in the Schlenk flask is carried out at 50° C. for 18 hours. After the reaction is completed, the mixture is poured into deionized water, filtered, and dried. The product is then washed with methanol to obtain the target product, 1.18 g of 4-(2,6-di(2H-1,2,3-triazol-4-yl) pyridin-4-yl)-N-(2,6-di(2H-1,2,3-triazol-4-yl) pyridin-4-yl)phenyl)-N-phenylaniline, with a yield of 42%.

FIG. 1 illustrates a NMR spectrum of the target product of 4-(2,6-di(2H-1,2,3-triazol-4-yl) pyridin-4-yl)-N-(2,6-di(2H-1,2,3-triazol-4-yl) pyridin-4-yl)phenyl)-N-phenylaniline according to the embodiment 1 of the disclosure. $^1H$ NMR (400 MHZ, $CDCl_3$) δ 8.23 (d, J=7.6 Hz, 1H), 7.85 (dd, J=6.6, 3.0 Hz, 1H), 7.59-7.46 (m, 2H), 7.39 (t, J=7.4 Hz, 1H), 7.36-7.28 (m, 3H), 7.19-7.05 (m, 2H). The peak position and integral peak area are consistent with the structure, which indicates the successful preparation of the target organic ligand.

Figure 2:
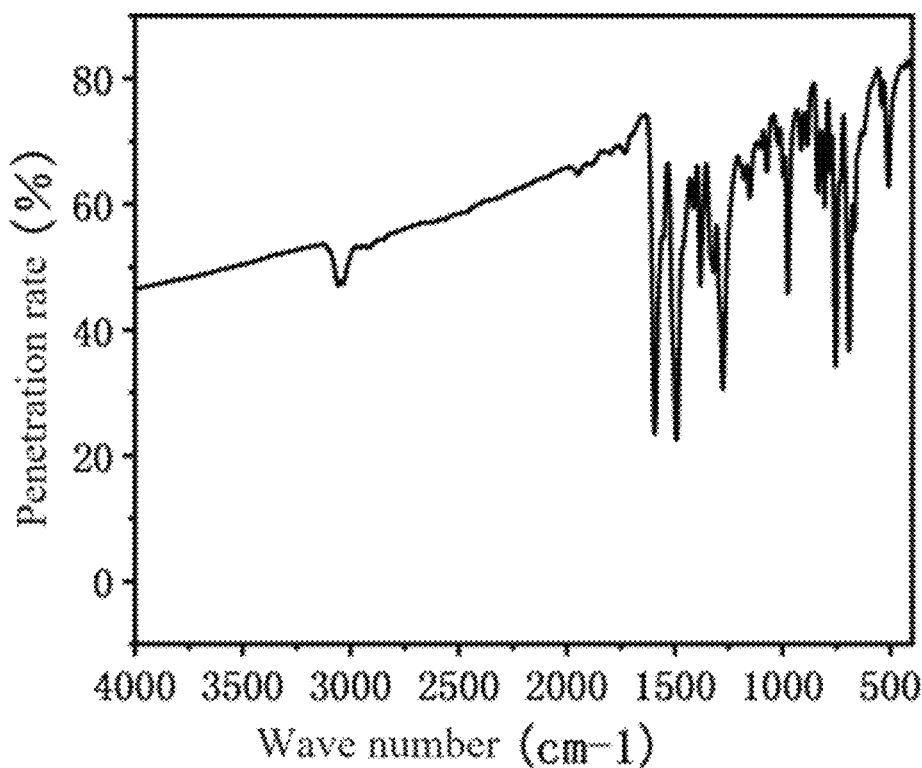
FIG. 2 illustrates a Fourier-transform infrared (FTIR) spectrum of the target product of 4-(2,6-di(2H-1,2,3-triazol-4-yl) pyridin-4-yl)-N-(2,6-di(2H-1,2,3-triazol-4-yl) pyridin-4-yl)phenyl)-N-phenylaniline according to the embodiment 1 of the disclosure.

FIG. 2 illustrates a FTIR spectrum of the target product of 4-(2,6-di(2H-1,2,3-triazol-4-yl) pyridin-4-yl)-N-(2,6-di(2H-1,2,3-triazol-4-yl) pyridin-4-yl)phenyl)-N-phenylaniline according to the embodiment 1 of the disclosure. The target product of the embodiment 1 has an absorption peak with a characteristic functional group structure, such as the C=N absorption peak at 1598 cm$^{-1}$.

Embodiment 2

A structure of the polydentate organic ligand is expressed by the structural formula as follows:

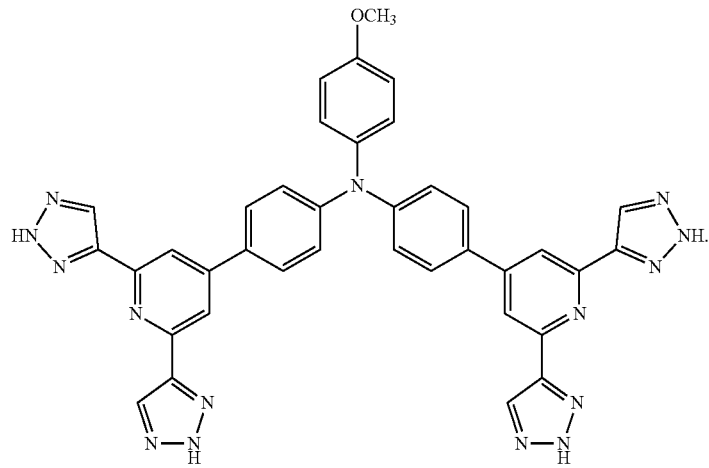

(1) 16.35 g (50.0 mmol) of bis(4-bromophenyl)amine, 11.7 g (50.0 mmol) of 4-iodoanisole (with a molecular formula of $C_7H_7IO$), 0.38 mg (2.0 mmol) of cuprous iodide, 0.36 mg (2.0 mmol) of 1,10-phenanthroline, and 16.83 g (0.3 mol) of potassium hydroxide are added into a Schlenk flask, the remaining operations and conditions of this step are carried out in accordance with that of the step (1) in the embodiment 1, and then 10.40 g of 4,4'-dibromotriphenylamine compound is obtained, with a yield of 48%.

(2) 10 g (23.1 mmol) of 4,4'-dibromotriphenylamine compound, 8.80 g (34.65 mmol) of bis(pinacolto)borane, 13.60 g (138.6 mmol) of potassium acetate, and 0.65 g (0.89 mmol) of Pd(dppf)Cl$_2$ are added into a Schlenk flask, and the remaining operations and conditions of this step are carried out in accordance with that of the step (2) in the embodiment 1. After the rotary evaporation, 5.12 g of 4,4'-diboronic acid pinacol ester triphenylamine compound is obtained, with a yield of 42%.

(3) 5 g (9.5 mmol) of the 4,4'-diboronic acid pinacol ester triphenylamine compound, 5.17 (14.25 g mmol) of 2,6-dibromo-4-iodopyridine, 7.88 g (57 mmol) of potassium carbonate, and 0.44 g (0.38 mmol) of Pd(pph$_4$)$_3$ are added into a Schlenk flask, the remaining operations and conditions of this step are carried out in accordance with that of the step (3) in the embodiment 1, and then 3.18 g of 4-(2,6-dibromopyridin-4-yl)-N-(4-(2,6-dibromopyridin-4-yl)phenyl)-N-phen ylaniline compound is obtained, with a yield of 45%.

(4) 3.70 g (25 mmol) of 4-bromo-2h-1,2,3-triazole, 9.52 g (37.5 mmol) of bis(pinacolto)borane, 15.90 g (0.15 mol) of sodium carbonate, and 0.73 g (1 mmol) of Pd(dppf)Cl$_2$ are added into a Schlenk flask, and the remaining operations and conditions of this step are carried out in accordance with that of the step (4) in the embodiment 1. After the rotary evaporation, 2.05 g of 4-(4,4,5,5-tetramethyl-1,3,2-dioxaborolan-2-yl)-2H-1,2,3-triazole is obtained, with a yield of 42%.

(5) 1.17 g (6 mmol) of the 4-(4,4,5,5-tetramethyl-1,3,2-dioxaborolan-2-yl)-2H-1,2,3-triazole, 3 g (4 mmol) of the 4-(2,6-dibromopyridin-4-yl)-N-(4-(2,6-dibromopyridin-4-yl)phenyl)-N-phen ylaniline compound obtained from the step (3), 3.32 g (24 mmol) of potassium carbonate, and 0.18 g (0.16 mmol) of tetrakis(triphenylphosphine)palladium are added into a Schlenk flask, the remaining operations and conditions are carried out in accordance with that of the step (5) in the embodiment 1, and then the target product, 1.12 g of triphenylamine-pyridine substituted triazole compound (i.e., polydentate organic ligand), is obtained with a yield of 40%.

Embodiment 3

A structure of the polydentate organic ligand is expressed by the structural formula as follows:

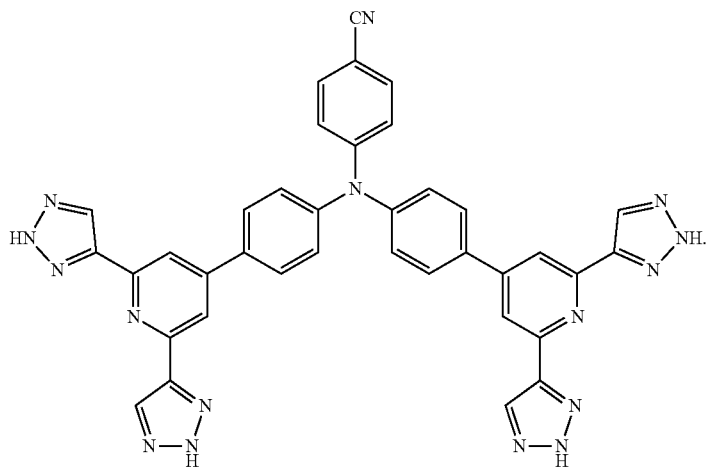 [SMILES: N#Cc1ccc(N(c2ccc(-c3cc(-c4cn[nH]n4)nc(-c4cn[nH]n4)c3)cc2)c2ccc(-c3cc(-c4cn[nH]n4)nc(-c4cn[nH]n4)c3)cc2)cc1]

(1) 16.35 g (50.0 mmol) of bis(4-bromophenyl)amine, 11.45 g (50.0 mmol) of 4-iodobenzonitrile (with a molecular formula of $C_7H_4IN$), 0.38 mg (2.0 mmol) of cuprous iodide, 0.36 mg (2.0 mmol) of 1,10-phenanthroline, and 16.83 g (0.3 mol) of potassium hydroxide are added into a Schlenk flask, the remaining operations and conditions of this step are carried out in accordance with that of the step (1) in the embodiment 1, and then 9.63 g of 4,4'-dibromotriphenylamine compound is obtained, with a yield of 45%.

(2) 9 g (21 mmol) of the 4,4'-dibromotriphenylamine compound, 8.0 g (31.5 mmol) of bis(pinacolto)borane, 12.37 g (126 mmol) of potassium acetate, and 0.61 g (0.84 mmol) of Pd(dppf)Cl$_2$ are added into a Schlenk flask, and the remaining operations and conditions of this step are carried out in accordance with that of the step (2) in the embodiment 1. After the rotary evaporation, 4.5 g of 4,4'-diboronic acid pinacol ester triphenylamine compound is obtained, with a yield of 41%.

(3) 4 g (7.6 mmol) of the 4,4'-diboronic acid pinacol ester triphenylamine compound, 4.14 g (11.4 mmol) of 2,6-dibromo-4-iodopyridine, 6.3 g (45.6 mmol) of potassium carbonate, and 0.35 g (0.3 mmol) of Pd(pph$_4$)$_3$ are added into a Schlenk flask, the remaining operations and conditions of this step are carried out in accordance with that of the step (3) in the embodiment 1, and then 2.14 g of 4-(2,6-dibromopyridin-4-yl)-N-(4-(2,6-dibromopyridin-4-yl)phenyl)-N-phen ylaniline compound is obtained, with a yield of 38%.

(4) 3.70 g (25 mmol) of 4-bromo-2h-1,2,3-triazole, 9.52 g (37.5 mmol) of bis(pinacolto)borane, 15.90 g (0.15 mol) of sodium carbonate, and 0.73 g (1 mmol) of Pd(dppf)Cl$_2$ are added into a Schlenk flask, the remaining operations and conditions of this step are carried out in accordance with that of the step (4) in the embodiment 1, and then 2.15 g of 4-(4,4,5,5-tetramethyl-1,3,2-dioxaborolan-2-yl)-2H-1,2,3-triazole is obtained, with a yield of 44%.

(5) 0.79 g (4.05 mmol) of the 4-(4,4,5,5-tetramethyl-1,3,2-dioxaborolan-2-yl)-2H-1,2,3-triazole, 2 g (2.7 mmol) of the 4-(2,6-dibromopyridin-4-yl)-N-(4-(2,6-dibromopyridin-4-yl)phenyl)-N-phen ylaniline compound obtained from the step (3), 2.24 g (16.2 mmol) of potassium carbonate, and 0.12 g (0.11 mmol) of tetrakis(triphenylphosphine)palladium are added into a Schlenk flask, the remaining operations and conditions of this step are carried out in accordance with that of the step (5) in the embodiment 1, and then the target product, 0.79 g of triphenylamine-pyridine substituted triazole compound, is obtained, with a yield of 42%.

Embodiment 4

A structure of the polydentate organic ligand is expressed by the structural formula as follows:

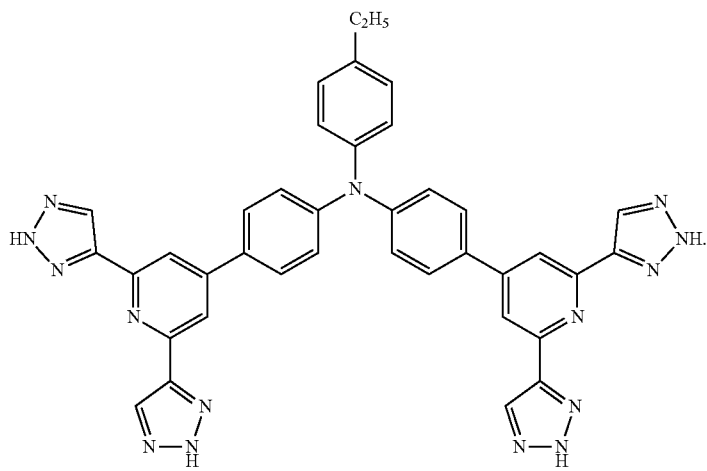 [SMILES: CCc1ccc(N(c2ccc(-c3cc(-c4cn[nH]n4)nc(-c4cn[nH]n4)c3)cc2)c2ccc(-c3cc(-c4cn[nH]n4)nc(-c4cn[nH]n4)c3)cc2)cc1]

(1) 16.35 g (50.0 mmol) of bis(4-bromophenyl)amine, 34.8 g (150.0 mmol) of 4-ethyliodobenzene (with a molecular formula of $C_8H_9I$), 0.57 mg (3.0 mmol) of cuprous iodide, 0.54 mg (3.0 mmol) of 1,10-phenanthroline, and 28.06 g (0.5 mol) of potassium hydroxide are added into a Schlenk flask, followed by applying three nitrogen-vacuum cycles to the Schlenk flask, and then 150 ml of anhydrous toluene is added into the Schlenk flask as the solvent, followed by applying three nitrogen-vacuum cycles to the Schlenk flask again. The mixture in the Schlenk flask is heated to 130° C. and reacts for 40 hours. After the reaction is complete, the product is extracted with 30 ml of dichloromethane and 20 ml of saturated sodium chloride solution, the organic phases are combined and dried using anhydrous sodium sulfate, and then the solvent is removed by rotary evaporation. The product is purified by column chromatography using a dichloromethane/petroleum ether eluent (with a volume ratio of dichloromethane to petroleum ether of 6:1) to obtain 9.27 g of 4,4'-dibromotriphenylamine compound, with a yield of 43%.

(2) 9 g (21 mmol) of the 4,4'-dibromotriphenylamine compound, 26.66 g (105 mmol) of bis(pinacolto)borane, 18.55 g (189 mmol) of potassium acetate, and 0.92 g (1.26 mmol) of $Pd(dppf)Cl_2$ are added into a Schlenk flask, followed by applying three nitrogen-vacuum cycles to the Schlenk flask, and then 210 ml of 1,4-dioxane is added into the Schlenk flask as the solvent by using a syringe, followed by applying three nitrogen-vacuum cycles to the Schlenk flask again. The reaction in the Schlenk flask is carried out at 100° C. for 48 hours. After the reaction is completed, the product is extracted with 30 ml of dichloromethane and 20 ml of water, and the organic phases are combined and dried with anhydrous sodium sulfate. After rotary evaporation, 4.41 g of 4,4'-diboronic acid pinacol ester triphenylamine compound is obtained, with a yield of 40%.

(3) 4 g (7.6 mmol) of the 4,4'-diboronic acid pinacol ester triphenylamine compound, 13.79 g (38 mmol) of 2,6-dibromo-4-iodopyridine, 9.45 g (68.4 mmol) of potassium carbonate, and 0.53 g (0.46 mmol) of $Pd(pph_4)_3$ are added into a Schlenk flask, followed by applying three nitrogen-vacuum cycles to the Schlenk flask, and then 100 ml of 1,4-dioxane and 30 ml of water are added into the Schlenk flask as a solvent by using a syringe, followed by applying three nitrogen-vacuum cycles to the Schlenk flask again. The reaction in the Schlenk flask is carried out at 80° C. for 48 hours. After the reaction is completed, the mixture is poured into deionized water, filtered, and dried. The product is then washed with methanol to obtain 2.15 g of 4-(2,6-dibromopyridin-4-yl)-N-(4-(2,6-dibromopyridin-4-yl)phenyl)-N-phen ylaniline compound, with a yield of 38%.

(4) 5.92 g (40 mmol) of 4-bromo-2h-1,2,3-triazole, 50.79 g (0.2 mol) of bis(pinacolto)borane, 35.33 g (0.36 mol) of potassium acetate, and 1.76 g (2.4 mmol) of $Pd(dppf)Cl_2$ are added into a Schlenk flask, followed by applying three nitrogen-vacuum cycles to the Schlenk flask, and then 400 ml of 1,4-dioxane is added into the Schlenk flask as the solvent by using a syringe, followed by applying three nitrogen-vacuum cycles to the Schlenk flask again. The reaction in the Schlenk flask is carried out at 100° C. for 48 hours. After the reaction is completed, the product is extracted with 30 ml of dichloromethane and 20 ml of water, and the organic phases are combined and dried with anhydrous sodium sulfate. After rotary evaporation, 3.51 g of 4-(4,4,5,5-tetramethyl-1,3,2-dioxaborolan-2-yl)-2H-1,2,3-triazole is obtained, with a yield of 45%.

(5) 2.64 g (13.5 mmol) of the 4-(4,4,5,5-tetramethyl-1,3,2-dioxaborolan-2-yl)-2H-1,2,3-triazole, 2 g (2.7 mmol) of the 4-(2,6-dibromopyridin-4-yl)-N-(4-(2,6-dibromopyridin-4-yl)phenyl)-N-phen ylaniline compound, 3.36 g (24.3 mmol) of potassium carbonate, and 0.18 g (0.16 mmol) of tetrakis(triphenylphosphine)palladium are added into a Schlenk flask, followed by applying three nitrogen-vacuum cycles to the Schlenk flask, and then 35 ml of 1,4-dioxane and 11 ml of water are added into the Schlenk flask as the solvent by using a syringe, followed by applying three nitrogen-vacuum cycles to the Schlenk flask again. The reaction in the Schlenk flask is carried out at 80° C. for 48 hours. After the reaction is completed, the mixture is poured into deionized water, filtered, and dried. The product is then washed with methanol to obtain the target product, 0.86 g of triphenylamine-pyridine substituted triazole compound, with a yield of 46%.

Embodiment 5

A structure of the polydentate organic ligand is expressed by the structural formula as follows:

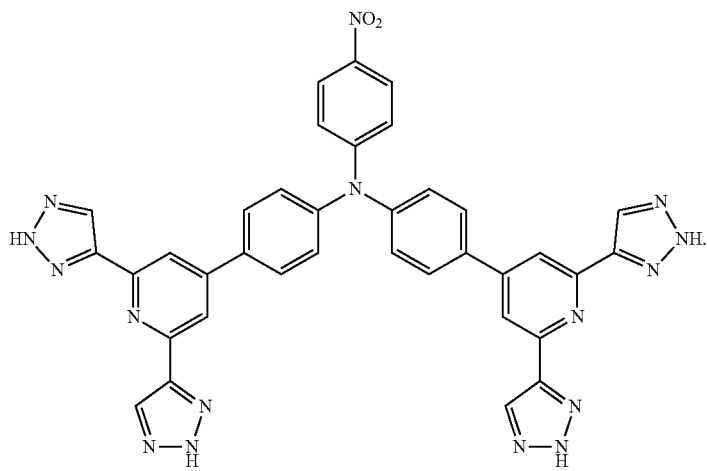 [SMILES: O=[N+]([O-])c1ccc(N(c2ccc(-c3cc(-c4cn[nH]n4)nc(-c4cn[nH]n4)c3)cc2)c2ccc(-c3cc(-c4cn[nH]n4)nc(-c4cn[nH]n4)c3)cc2)cc1]

(1) 16.35 g (50.0 mmol) of bis(4-bromophenyl)amine, 24.90 g (100.0 mmol) of 1-iodo-4-nitrobenzene (with a molecular formula of $C_6H_4INO_2$), 0.48 mg (2.5 mmol) of cuprous iodide, 0.45 mg (2.5 mmol) of 1,10-phenanthroline, and 22.45 g (0.4 mol) of potassium hydroxide are added into a Schlenk flask, followed by applying three nitrogen-vacuum cycles to the Schlenk flask, and then 250 ml of anhydrous toluene is added into the Schlenk flask as the solvent, followed by applying three nitrogen-vacuum cycles to the Schlenk flask again. The mixture in the Schlenk flask is heated to 125° C. and reacts for 25 hours. After the reaction is complete, the product is extracted with 30 ml of dichloromethane and 15 ml of saturated sodium chloride solution, the organic phases are combined and dried using anhydrous sodium sulfate, and then the solvent is removed by rotary evaporation. The product is purified by column chromatography using a dichloromethane/petroleum ether eluent (with a volume ratio of dichloromethane to petroleum ether of 10:1) to obtain 12.55 g of 4,4'-dibromotriphenylamine compound, with a yield of 56%.

(2) 12 g (26.8 mmol) of the 4,4'-dibromotriphenylamine compound, 20.42 g (80.4 mmol) of bis(pinacolto)borane, 21.04 g (214.4 mmol) of potassium acetate, and 0.98 g (1.34 mmol) of Pd(dppf)Cl$_2$ are added into a Schlenk flask, followed by applying three nitrogen-vacuum cycles to the Schlenk flask, and then 268 ml of 1,4-dioxane is added into the Schlenk flask as the solvent by using a syringe, followed by applying three nitrogen-vacuum cycles to the Schlenk flask again. The reaction in the Schlenk flask is carried out at 90° C. for 36 hours. After the reaction is completed, the product is extracted with 30 ml of dichloromethane and 15 ml of water, and the organic phases are combined and dried with anhydrous sodium sulfate. After rotary evaporation, 7.7 g of 4,4'-diboronic acid pinacol ester triphenylamine compound is obtained, with a yield of 53%.

(3) 7 g (13 mmol) of the 4,4'-diboronic acid pinacol ester triphenylamine compound, 14.15 g (39 mmol) of 2,6-dibromo-4-iodopyridine, 14.37 g (104 mmol) of potassium carbonate, and 0.75 g (0.65 mmol) of Pd(pph$_4$)$_3$ are added into a Schlenk flask, followed by applying three nitrogen-vacuum cycles to the Schlenk flask, and then 140 ml of 1,4-dioxane and 40 ml of water are added into the Schlenk flask as a solvent by using a syringe, followed by applying three nitrogen-vacuum cycles to the Schlenk flask again. The reaction in the Schlenk flask is carried out at 60° C. for 33 hours. After the reaction is completed, the mixture is poured into deionized water, filtered, and dried. The product is then washed with methanol to obtain 5.63 g of 4-(2,6-dibromopyridin-4-yl)-N-(4-(2,6-dibromopyridin-4-yl)phenyl)-N-phen ylaniline compound, with a yield of 57%.

(4) 8.87 g (60 mmol) of 4-bromo-2h-1,2,3-triazole, 45.71 g (0.18 mmol) of bis(pinacolto)borane, 47.11 g (0.48 mol) of potassium acetate, and 2.20 g (3 mmol) of Pd(dppf)Cl$_2$ are added into a Schlenk flask, followed by applying three nitrogen-vacuum cycles to the Schlenk flask, and then 600 ml of 1,4-dioxane is added into the Schlenk flask as the solvent by using a syringe, followed by applying three nitrogen-vacuum cycles to the Schlenk flask again. The reaction in the Schlenk flask is carried out at 90° C. for 36 hours. After the reaction is completed, the product is extracted with 30 ml of dichloromethane and 15 ml of water, and the organic phases are combined and dried with anhydrous sodium sulfate. After rotary evaporation, 5.73 g of 4-(4,4,5,5-tetramethyl-1,3,2-dioxaborolan-2-yl)-2H-1,2,3-triazole is obtained, with a yield of 49%.

(5) 3.86 g (19.8 mmol) of the 4-(4,4,5,5-tetramethyl-1,3,2-dioxaborolan-2-yl)-2H-1,2,3-triazole, 5 g (6.6 mmol) of the 4-(2,6-dibromopyridin-4-yl)-N-(4-(2,6-dibromopyridin-4-yl)phenyl)-N-phen ylaniline compound, 7.30 g (52.8 mmol) of potassium carbonate, and 0.38 g (0.33 mmol) of tetrakis(triphenylphosphine)palladium are added into a Schlenk flask, followed by applying three nitrogen-vacuum cycles to the Schlenk flask, and then 77 ml of 1,4-dioxane and 22 ml of water are added into the Schlenk flask as the solvent by using a syringe, followed by applying three nitrogen-vacuum cycles to the Schlenk flask again. The reaction in the Schlenk flask is carried out at 65° C. for 33 hours. After the reaction is completed, the mixture is poured into deionized water, filtered, and dried. The product is then washed with methanol to obtain the target product, 2.63 g of triphenylamine-pyridine substituted triazole compound, with a yield of 56%.

Embodiment 6

A structure of the polydentate organic ligand is expressed by the structural formula as follows:

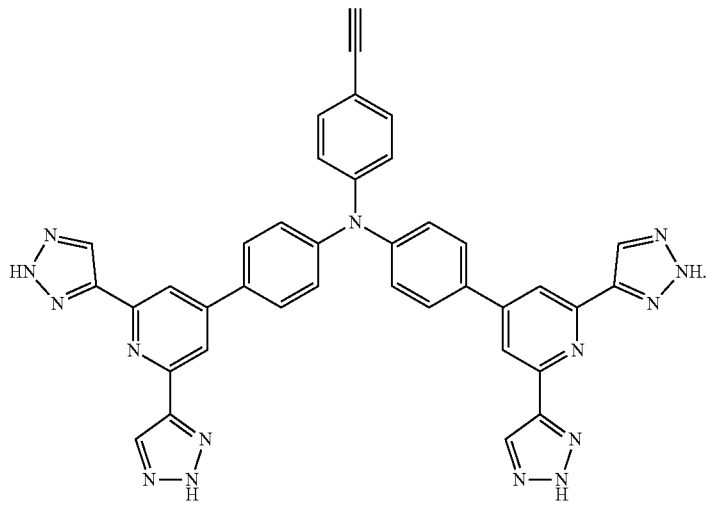 [SMILES: C#Cc1ccc(N(c2ccc(-c3cc(-c4cn[nH]n4)nc(-c4cn[nH]n4)c3)cc2)c2ccc(-c3cc(-c4cn[nH]n4)nc(-c4cn[nH]n4)c3)cc2)cc1]

(1) 16.35 g (50.0 mmol) of bis(4-bromophenyl)amine, 22.80 g (100.0 mmol) of 1-iodo-4-ethynylbenzene (with a molecular formula of $C_8H_5I$), 0.48 mg (2.5 mmol) of cuprous iodide, 0.45 mg (2.5 mmol) of 1,10-phenanthroline, and 22.45 g (0.4 mol) of potassium hydroxide are added into a Schlenk flask, the remaining operations and conditions of this step are carried out in accordance with that of the step (1) in the embodiment 5, and then 15.29 g of 4,4'-dibromotriphenylamine compound is obtained, with a yield of 58%.

(2) 15 g (35 mmol) of the 4,4'-dibromotriphenylamine compound, 26.66 g (105 mmol) of bis(pinacolto)borane, 32.44 g (280 mmol) of lithium phosphate, and 1.28 g (1.75 mmol) of Pd(dppf)Cl$_2$ are added into a Schlenk flask, and the remaining operations and conditions of this step are carried out in accordance with that of the step (2) in the embodiment 5. After the rotary evaporation, 9.12 g of 4,4'-diboronic acid pinacol ester triphenylamine compound is obtained, with a yield of 50%.

(3) 9 g (17.3 mmol) of the 4,4'-diboronic acid pinacol ester triphenylamine compound, 18.83 g (51.9 mmol) of 2,6-dibromo-4-iodopyridine, 19.13 g (138.4 mmol) of potassium carbonate, and 1.0 g (0.87 mmol) of Pd(pph$_4$)$_3$ are added into a Schlenk flask, the remaining operations and conditions of this step are carried out in accordance with that of the step (3) in the embodiment 5, and then 6.90 g of 4-(2,6-dibromopyridin-4-yl)-N-(4-(2,6-dibromopyridin-4-yl)phenyl)-N-phen ylaniline compound is obtained, with a yield of 54%.

(4) 8.87 g (60 mmol) of 4-bromo-2h-1,2,3-triazole, 45.71 g (0.18 mol) of bis(pinacolto)borane, 47.11 g (0.48 mol) of potassium acetate, and 2.20 g (3 mmol) of Pd(dppf)Cl$_2$ are added into a Schlenk flask, the remaining operations and conditions of this step are carried out in accordance with that of the step (4) in then 6.32 of the embodiment 5, and g 4-(4,4,5,5-tetramethyl-1,3,2-dioxaborolan-2-yl)-2H-1,2,3-triazole is obtained, with a yield of 54%.

(5) 4.68 g (24 mmol) of the 4-(4,4,5,5-tetramethyl-1,3,2-dioxaborolan-2-yl)-2H-1,2,3-triazole, 6 g (8 mmol) of the 4-(2,6-dibromopyridin-4-yl)-N-(4-(2,6-dibromopyridin-4-yl)phenyl)-N-phen ylaniline compound obtained from the step (3), 8.85 g (64 mmol) of potassium carbonate, and 0.46 g (0.4 mmol) of tetrakis(triphenylphosphine)palladium are added into a Schlenk flask, and the remaining operations and conditions of this step are carried out in accordance with that of the step (5) in the embodiment 5.

The target product, 2.88 g of triphenylamine-pyridine substituted triazole compound, is obtained, with a yield of 52%.

Embodiment 7

A structure of the polydentate organic ligand is expressed by the structural formula as follows:

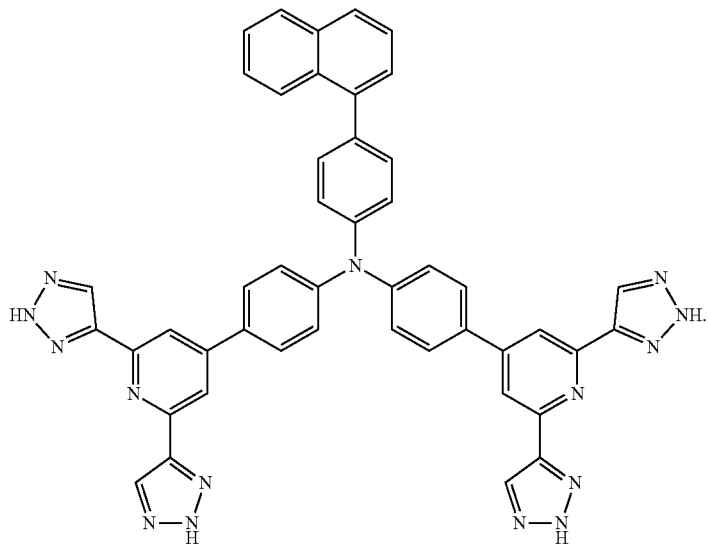 [SMILES: c1ccc2c(-c3ccc(N(c4ccc(-c5cc(-c6cn[nH]n6)nc(-c6cn[nH]n6)c5)cc4)c4ccc(-c5cc(-c6cn[nH]n6)nc(-c6cn[nH]n6)c5)cc4)cc3)cccc2c1]

(1) 16.35 g (50.0 mmol) of bis(4-bromophenyl)amine, 33.00 g (100.0 mmol) of 1-(4-iodobenzene) naphthalene (with a molecular formula of $C_{16}H_{11}I$), 0.48 mg (2.5 mmol) of cuprous iodide, 0.45 mg (2.5 mmol) of 1,10-phenanthroline, and 22.45 g (0.4 mol) of potassium hydroxide are added into a Schlenk flask, the remaining operations and conditions of this step are carried out in accordance with that of the step (1) in the embodiment 5, and then 13.49 g of 4,4'-dibromotriphenylamine compound is obtained, with a yield of 51%.

(2) 13 g (24.57 mmol) of the 4,4'-dibromotriphenylamine compound, 18.72 g (73.71 mmol) of bis(pinacolto)borane, 19.29 g (196.56 mmol) of potassium acetate, and 0.90 g (1.23 mmol) of $Pd(dppf)Cl_2$ are added into a Schlenk flask, the remaining operations and conditions of this step are carried out in accordance with that of the step (2) in the embodiment 5, and then 8.42 g of 4,4'-diboronic acid pinacol ester triphenylamine compound is obtained, with a yield of 55%.

(3) 8 g (12.84 mmol) of the 4,4'-diboronic acid pinacol ester triphenylamine compound, 13.97 g (38.52 mmol) of 2,6-dibromo-4-iodopyridine, 14.20 g (107.72 mmol) of potassium carbonate, and 0.74 g (0.64 mmol) of $Pd(pph_4)_3$ are added into a Schlenk flask, the remaining operations and conditions of this step are carried out in accordance with that of the step (3) in the embodiment 5, and then 5.61 g of 4-(2,6-dibromopyridin-4-yl)-N-(4-(2,6-dibromopyridin-4-yl)phenyl)-N-phen ylaniline compound is obtained, with a yield of 52%.

(4) 8.87 g (60 mmol) of 4-bromo-2h-1,2,3-triazole, 45.71 g (0.18 mol) of bis(pinacolto)borane, 47.11 g (0.48 mol) of potassium acetate, and 2.20 g (3 mmol) of $Pd(dppf)Cl_2$ are added into a Schlenk flask, the remaining operations and conditions of this step are carried out in accordance with that of the step (4) in the embodiment 5, and then 5.62 g of 4-(4,4,5,5-tetramethyl-1,3,2-dioxaborolan-2-yl)-2H-1,2,3-triazole is obtained, with a yield of 48%.

(5) 3.48 g (17.82 mmol) of the 4-(4,4,5,5-tetramethyl-1,3,2-dioxaborolan-2-yl)-2H-1,2,3-triazole, 5 g (5.94 mmol) of 4-(2,6-dibromopyridin-4-yl)-N-(4-(2,6-dibromopyridin-4-yl)phenyl)-N-phen the ylaniline compound obtained from the step (3), 6.57 g (47.52 mmol) of potassium carbonate, and 0.34 g (0.3 mmol) of tetrakis(triphenylphosphine)palladium are added into a Schlenk flask, and the remaining operations and conditions of this step are carried out in accordance with that of the step (5) in the embodiment 5. The target product, 2.55 g of triphenylamine-pyridine substituted triazole compound, is obtained, with a yield of 54%.

Embodiment 8

A structure of the polydentate organic ligand is expressed by the structural formula as follows:

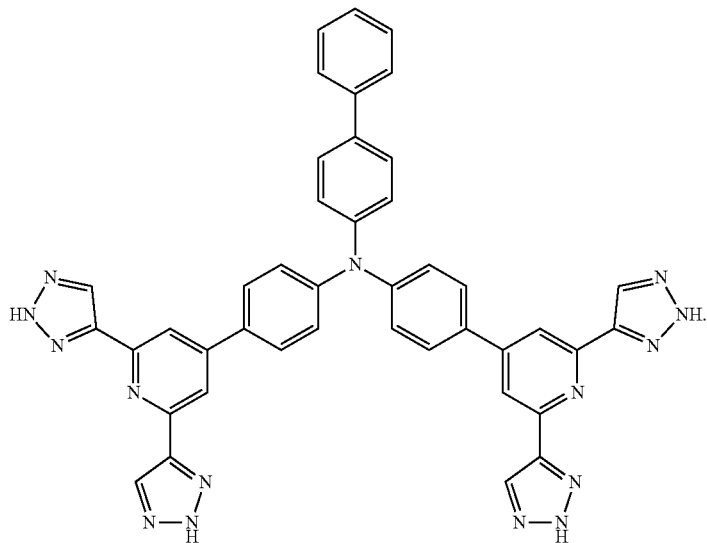 [SMILES: c1ccc(-c2ccc(N(c3ccc(-c4cc(-c5cn[nH]n5)nc(-c5cn[nH]n5)c4)cc3)c3ccc(-c4cc(-c5cn[nH]n5)nc(-c5cn[nH]n5)c4)cc3)cc2)cc1]

(1) 16.35 g (50.0 mmol) of bis(4-bromophenyl)amine, 28.00 g (100.0 mmol) of 1-iodo-4-phenylbenzene (with a molecular formula of $C_{12}H_9I$), 0.48 mg (2.5 mmol) of cuprous iodide, 0.45 mg (2.5 mmol) of 1,10-phenanthroline, and 22.45 g (0.4 mol) of potassium hydroxide are added into a Schlenk flask, followed by applying three nitrogen-vacuum cycles to the Schlenk flask, and then 200 ml of anhydrous toluene is added into the Schlenk flask as the solvent, followed by applying three nitrogen-vacuum cycles to the Schlenk flask again. The mixture in the Schlenk flask is heated to 125° C. and reacts for 25 hours. After the reaction is complete, the product is extracted with 30 ml of dichloromethane and 25 ml of saturated sodium chloride solution, the organic phases are combined and dried using anhydrous sodium sulfate, and then the solvent is removed by rotary evaporation. The product is purified by column chromatography using a dichloromethane/petroleum ether eluent (with a volume ratio of dichloromethane to petroleum ether of 8:1) to obtain 13.18 g of 4,4'-dibromotriphenylamine compound, with a yield of 55%.

(2) 13 g (27 mmol) of the 4,4'-dibromotriphenylamine compound, 27.43 g (108 mmol) of bis(pinacolto)borane, 24.33 g (229.5 mmol) of sodium carbonate, and 1.09 g (1.5 mmol) of Pd(dppf)Cl$_2$ are added into a Schlenk flask, followed by applying three nitrogen-vacuum cycles to the Schlenk flask, and then 270 ml of 1,4-dioxane is added into the Schlenk flask as the solvent by using a syringe, followed by applying three nitrogen-vacuum cycles to the Schlenk flask again. The reaction in the Schlenk flask is carried out at 95° C. for 42 hours. After the reaction is completed, the product is extracted with 30 ml of dichloromethane and 25 ml of water, and the organic phases are combined and dried with anhydrous sodium sulfate. After rotary evaporation, 7.43 g of 4,4'-diboronic acid pinacol ester triphenylamine compound is obtained, with a yield of 48%.

(3) 7 g (12 mmol) of the 4,4'-diboronic acid pinacol ester triphenylamine compound, 17.41 g (48 mmol) of 2,6-dibromo-4-iodopyridine, 14.10 g (102 mmol) of potassium carbonate, and 0.76 g (0.66 mmol) of Pd(pph$_4$)$_3$ are added into a Schlenk flask, followed by applying three nitrogen-vacuum cycles to the Schlenk flask, and then 140 ml of 1,4-dioxane and 41 ml of water are added into the Schlenk flask as a solvent by using a syringe, followed by applying three nitrogen-vacuum cycles to the Schlenk flask again. The reaction in the Schlenk flask is carried out at 70° C. for 36 hours. After the reaction is completed, the mixture is poured into deionized water, filtered, and dried. The product is then washed with methanol to obtain 4.37 g of 4-(2,6-dibromopyridin-4-yl)-N-(4-(2,6-dibromopyridin-4-yl)phenyl)-N-phen ylaniline compound, with a yield of 46%.

(4) 8.87 g (60 mmol) of 4-bromo-2h-1,2,3-triazole, 60.95 g (0.24 mol) of bis(pinacolto)borane, 37.68 g (0.51 mol) of lithium carbonate, and 2.41 g (3.3 mmol) of Pd(dppf)Cl$_2$ are added into a Schlenk flask, followed by applying three nitrogen-vacuum cycles to the Schlenk flask, and then 600 ml of 1,4-dioxane is added into the Schlenk flask as the solvent by using a syringe, followed by applying three nitrogen-vacuum cycles to the Schlenk flask again. The reaction in the Schlenk flask is carried out at 95° C. for 42 hours. After the reaction is completed, the product is extracted with 30 ml of dichloromethane and 25 ml of water, and the organic phases are combined and dried with anhydrous sodium sulfate. After rotary evaporation, 5.27 g of 4-(4,4,5,5-tetramethyl-1,3,2-dioxaborolan-2-yl)-2H-1,2,3-triazole is obtained, with a yield of 45%.

(5) 4.68 g (24 mmol) of the 4-(4,4,5,5-tetramethyl-1,3,2-dioxaborolan-2-yl)-2H-1,2,3-triazole, 5 g (6.0 mmol) of the 4-(2,6-dibromopyridin-4-yl)-N-(4-(2,6-dibromopyridin-4-yl)phenyl)-N-phen ylaniline compound, 7.05 g (51 mmol) of potassium carbonate, and 0.38 g (0.33 mmol) of tetrakis(triphenylphosphine)palladium are added into a Schlenk flask, followed by applying three nitrogen-vacuum cycles to the Schlenk flask, and then 70 ml of 1,4-dioxane and 21 ml of water are added into the Schlenk flask as the solvent by using a syringe, followed by applying three nitrogen-vacuum cycles to the Schlenk flask again. The reaction in the Schlenk flask is carried out at 70° C. for 36 hours. After the reaction is completed, the mixture is poured into deionized water, filtered, and dried. The product is then washed with methanol to obtain the target product, 2.23 g of triphenylamine-pyridine substituted triazole compound, with a yield of 50%.

Embodiment 9

A structure of the polydentate organic ligand is expressed by the structural formula as follows:

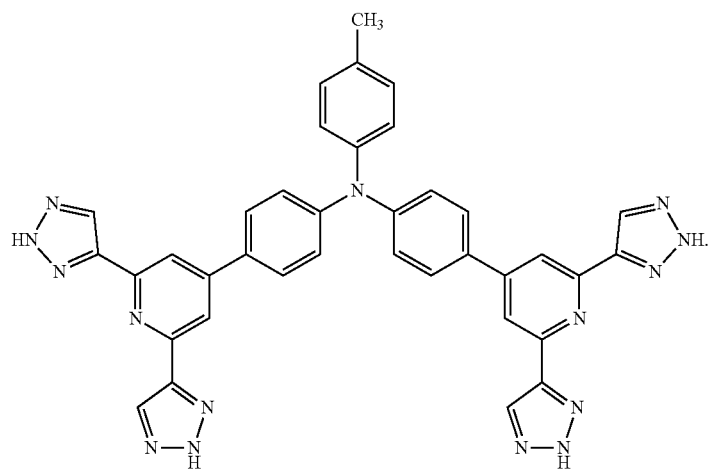

(1) 16.35 g (50.0 mmol) of bis(4-bromophenyl)amine, 21.80 g (100.0 mmol) of 1-iodo-4-methylbenzene (with a molecular formula of $C_7H_7I$), 0.48 mg (2.5 mmol) of cuprous iodide, 0.45 mg (2.5 mmol) of 1,10-phenanthroline, and 22.45 g (0.4 mol) of potassium hydroxide are added into a Schlenk flask, the remaining operations and conditions of this step are carried out in accordance with that of the step (1) in the embodiment 8, and then 11.05 g of 4,4'-dibromotriphenylamine compound is obtained, with a yield of 53%.

(2) 11 g (26.37 mmol) of the 4,4'-dibromotriphenylamine compound, 26.79 g (105.48 mmol) of bis(pinacolto)borane, 22.00 g (224.15 mmol) of potassium acetate, and 1.06 g (1.45 mmol) of Pd(dppf)Cl$_2$ are added into a Schlenk flask, and the remaining operations and conditions of this step are carried out in accordance with that of the step (2) in the embodiment 8. After the rotary evaporation, 6.20 g of 4,4'-diboronic acid pinacol ester triphenylamine compound is obtained, with a yield of 46%.

(3) 6 g (11.74 mmol) of the 4,4'-diboronic acid pinacol ester triphenylamine compound, 17.04 g (46.96 mmol) of 2,6-dibromo-4-iodopyridine, 13.79 g (99.79 mmol) of potassium carbonate, and 0.75 g (0.65 mmol) of Pd(pph$_4$)$_3$ are added into a Schlenk flask, the remaining operations and conditions of this step are carried out in accordance with that of the step (3) in the embodiment 8, and then 4.19 g of 4-(2,6-dibromopyridin-4-yl)-N-(4-(2,6-dibromopyridin-4-yl)phenyl)-N-phen ylaniline compound is obtained, with a yield of 49%.

(4) 8.87 g (60 mmol) of 4-bromo-2h-1,2,3-triazole, 60.95 g (0.24 mol) of bis(pinacolto)borane, 50.05 g (0.51 mol) of potassium acetate, and 2.41 g (3.3 mmol) of Pd(dppf)Cl$_2$ are added into a Schlenk flask, and the remaining operations and conditions of this step are carried out in accordance with that of the step (4) in the embodiment 8. After the rotary evaporation, 5.03 g of 4-(4,4,5,5-tetramethyl-1,3,2-dioxaborolan-2-yl)-2H-1,2,3-triazole is obtained, with a yield of 43%.

(5) 4.28 g (21.96 mmol) of the 4-(4,4,5,5-tetramethyl-1,3,2-dioxaborolan-2-yl)-2H-1,2,3-triazole, 4 g (5.49 mmol) of the 4-(2,6-dibromopyridin-4-yl)-N-(4-(2,6-dibromopyridin-4-yl)phenyl)-N-phen ylaniline compound obtained from the step (3), 6.45 g (46.67 mmol) of potassium carbonate, and 0.35 g (0.30 mmol) of tetrakis(triphenylphosphine) palladium are added into a Schlenk flask, the remaining operations and conditions are carried out in accordance with that of the step (5) in the embodiment 8, and then the target product, 1.68 g of triphenylamine-pyridine substituted triazole compound, is obtained, with a yield of 45%.

Embodiment 10

A structure of the polydentate organic ligand is expressed by the structural formula as follows:

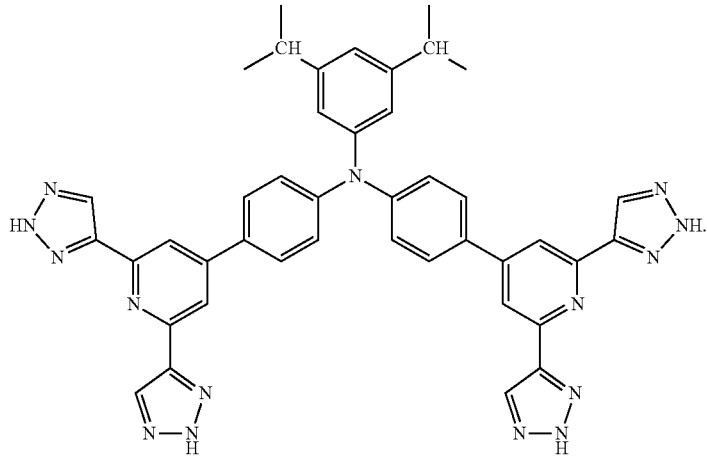 [SMILES: CC(C)c1cc(C(C)C)cc(N(c2ccc(-c3cc(-c4cn[nH]n4)nc(-c4cn[nH]n4)c3)cc2)c2ccc(-c3cc(-c4cn[nH]n4)nc(-c4cn[nH]n4)c3)cc2)c1]

(1) 16.35 g (50.0 mmol) of bis(4-bromophenyl)amine, 28.80 g (100.0 mmol) of 3,5-diisopropyl-iodobenzene (with a molecular formula of $C_{12}H_{17}I$), 0.48 mg (2.5 mmol) of cuprous iodide, 0.45 mg (2.5 mmol) of 1,10-phenanthroline, and 22.45 g (0.4 mol) of potassium hydroxide are added into a Schlenk flask, the remaining operations and conditions of this step are carried out in accordance with that of the step (1) in the embodiment 8, and then 12.91 g of 4,4'-dibromotriphenylamine compound is obtained, with a yield of 53%.

(2) 12 g (25 mmol) of the 4,4'-dibromotriphenylamine compound, 25.39 g (100 mmol) of bis(pinacolto)borane, 22.53 g (212.5 mmol) of potassium acetate, and 1.00 g (1.375 mmol) of Pd(dppf)Cl$_2$ are added into a Schlenk flask, and the remaining operations and conditions of this step are carried out in accordance with that of the step (2) in the embodiment 8. After the rotary evaporation, 7.41 g of 4,4'-diboronic acid pinacol ester triphenylamine compound is obtained, with a yield of 51%.

(3) 7.2 g (12.4 mmol) of the 4,4'-diboronic acid pinacol ester triphenylamine compound, 17.99 g (49.6 mmol) of 2,6-dibromo-4-iodopyridine, 14.57 g (105.4 mmol) of potassium carbonate, and 0.78 g (0.68 mmol) of Pd(pph$_4$)$_3$ are added into a Schlenk flask, the remaining operations and conditions of this step are carried out in accordance with that of the step (3) in the embodiment 8, and then 4.86 g of 4-(2,6-dibromopyridin-4-yl)-N-(4-(2,6-dibromopyridin-4-yl)phenyl)-N-phen ylaniline compound is obtained, with a yield of 49%.

(4) 8.87 g (60 mmol) of 4-bromo-2h-1,2,3-triazole, 60.95 g (0.24 mol) of bis(pinacolto)borane, 50.05 g (0.51 mol) of potassium acetate, and 2.41 g (3.3 mmol) of Pd(dppf)Cl$_2$ are added into a Schlenk flask, and the remaining operations and conditions of this step are carried out in accordance with that of the step (4) in the embodiment 8. After the rotary evaporation, 5.03 g of 4-(4,4,5,5-tetramethyl-1,3,2-dioxaborolan-2-yl)-2H-1,2,3-triazole is obtained, with a yield of 43%.

(5) 3.9 g (20 mmol) of the 4-(4,4,5,5-tetramethyl-1,3,2-dioxaborolan-2-yl)-2H-1,2,3-triazole, 4 g (5.0 mmol) of the 4-(2,6-dibromopyridin-4-yl)-N-(4-(2,6-dibromopyridin-4-yl)phenyl)-N-phen ylaniline compound obtained from the step (3), 4.87 g (42.5 mmol) of potassium carbonate, and 0.32 g (0.275 mmol) of tetrakis(triphenylphosphine)palladium are added into a Schlenk flask, the remaining operations and conditions of this step are carried out in accordance with that of the step (5) in the embodiment 8, and then the target product, 0.79 g of triphenylamine-pyridine substituted triazole compound, is obtained, with a yield of 48%.

Embodiment 11

A target ligand is polymerized with Fe(BF$_4$)$_2$·6H$_2$O to obtain a metal ion-ligand supramolecular polymer film marked film 1.

66.8 mg (0.1 mmol) of the target ligand (i.e., polydentate organic ligand) prepared in the embodiment 1 and 33.8 mg (0.1 mmol) of Fe(BF$_4$)$_2$·6H$_2$O are weighed to dissolve in 100 mL of glacial acetic acid, followed by performing reflux reaction at 50° C. for 12 h, so that the ligand is completely complexed with the metal ion. After the reaction, the filtrate is filtered and evaporated under reduced pressure, and the product is washed with ethanol for many times and then dried in vacuum to obtain 48 mg of solid metallo-supramolecular polymer.

25 mg of the solid metallo-supramolecular polymer is dissolved in 50 ml of methanol, followed by filtering out insoluble substances to obtain a solution, 20 ml of the solution is added into a watering can of a pneumatic pen, and then sprayed on the surface of the ITO conductive glass, and the ITO conductive glass sprayed with the solution is putted in an oven to dry at 30° C. for 12 hours. After methanol volatilizes from the surface of the ITO glass, a uniform metal ion-ligand supramolecular polymer film is obtained, which is marked as the film 1.

Figure 3:
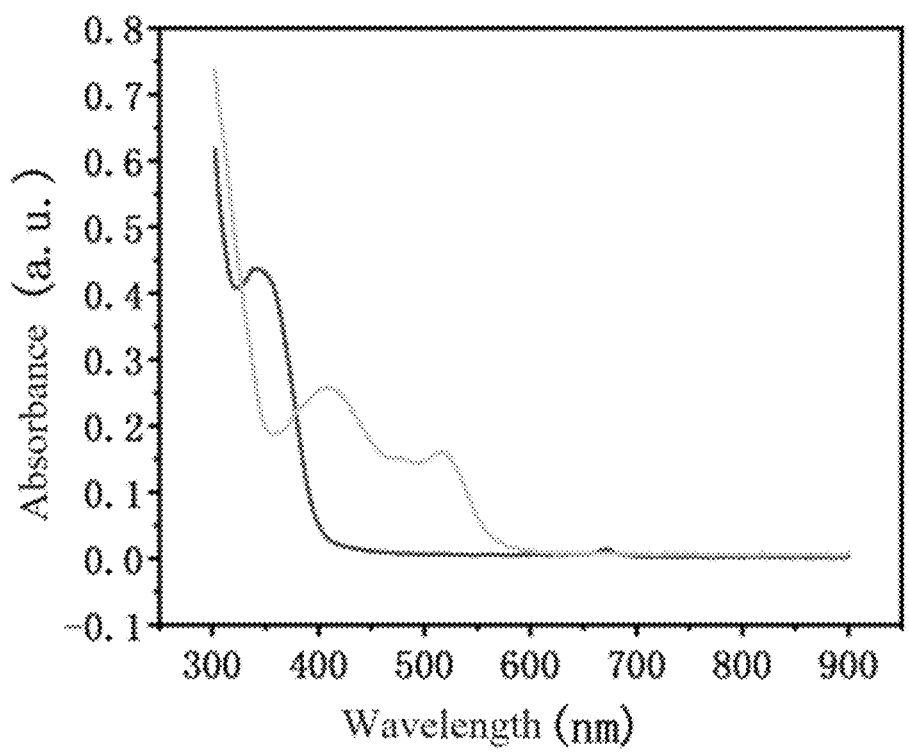
FIG. 3 illustrates an electrochromic spectrum of a metallo-supramolecular polymer marked film 1 according to an embodiment 11 of the disclosure.

The electrochromic performance of the prepared film 1 is detected. The detection method is as follows: in an Amperometric i-t Curve mode of an electrochemical workstation, a voltage of 1.2 V is applied to a working electrode, and at the same time, the change of absorbance at different wavelengths is monitored by a ultraviolet-visible near-infrared spectrophotometer. As shown in FIG. 3, after adding the metal ion, a new absorption peak appeared in the ultraviolet-visible absorption spectrum of the film 1, which confirms the successful preparation of the metallo-supramolecular polymer.

Figure 4:
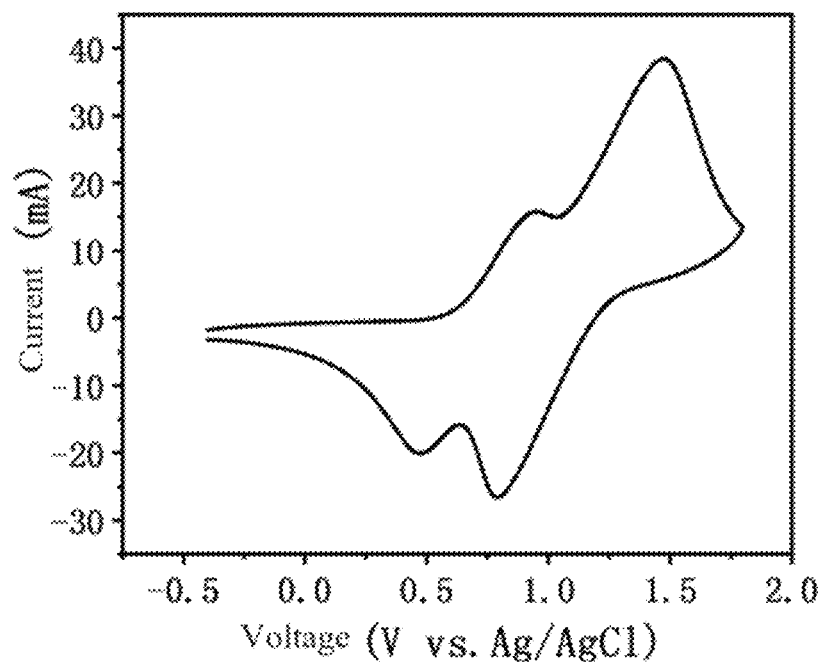
FIG. 4 illustrates a cyclic voltammogram of the metallo-supramolecular polymer marked film 1 according to the embodiment 11 of the disclosure.

The cyclic voltammetry performance of the prepared film 1 is detected as follows: the ITO glass containing the metal ion-ligand supramolecular polymer film in the embodiment 11 is used as an working electrode, a platinum wire is used as a counter electrode, Ag/AgCl is used as a reference electrode and 0.1 M acetonitrile solution of tetrabutyl ammonium perchlorate (TBAP) is used as electrolyte. Based on this three-electrode system, the cyclic voltammetry performance is detected by the electrochemical workstation in the range of scanning rate from 20 to 70, and the results are shown in FIG. 4. As can be seen from FIG. 4, the film 1 has a pair of reversible redox potentials.

Figure 5:
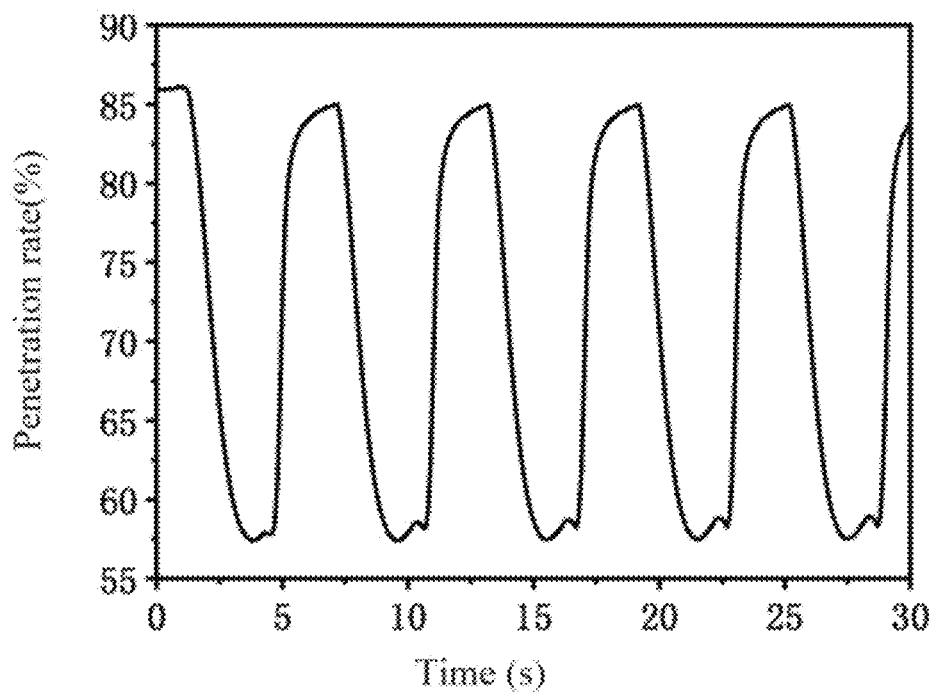
FIG. 5 illustrates an electrochromic response time spectrogram of the metallo-supramolecular polymer marked film 1 according to the embodiment 11 of the disclosure.

The electrochromic response time of the prepared film 1 is detected as follows: a square wave voltage of 0.00-1.30 V is applied to the working electrode by the electrochemical workstation in the Chronoamperometry mode, and the change of its absorption spectrum at 517 nm is monitored by the ultraviolet-visible near-infrared spectrophotometer. The results are shown in FIG. 5. As can be seen from FIG. 5, the film 1 has a faster response speed.

Embodiment 12

The target ligand is polymerized with $Cu(ClO_4)_2 \cdot 6H_2O$ to obtain a metal ion-ligand supramolecular polymer film marked film 2.

66.8 mg (0.1 mmol) of the target ligand prepared in the embodiment 1 and 55.7 mg (0.15 mmol) of $Cu(ClO_4)_2 \cdot 6H_2O$ are weighed to dissolve in 100 mL of glacial acetic acid, followed by performing reflux reaction at 60° C. for 24 h, so that the ligand is completely complexed with the metal ion. After the reaction, the filtrate is filtered and evaporated under reduced pressure, and the product is washed with ethanol for many times and then dried in vacuum to obtain 60 mg of solid metallo-supramolecular polymer.

25 mg of the solid metallo-supramolecular polymer is dissolved in 50 ml of methanol, followed by filtering out insoluble substances to obtain a solution, 30 ml of the solution is added into a watering can of a pneumatic pen, and then sprayed on the surface of an ITO conductive glass, and the ITO conductive glass sprayed with the solution is putted in an oven to dry at 34° C. for 18 hours. After methanol volatilizes from the surface of the ITO conductive glass, a uniform metal ion-ligand supramolecular polymer film is obtained, which is marked as the film 2.

The electrochromic performance, cyclic voltammetry performance and electrochromic response time of the obtained film 2 are detected, and the results are similar to those of the embodiment 11. After adding the metal ion, a new absorption peak appeared in the ultraviolet-visible absorption spectrum of the film, which confirms the successful preparation of the metallo-supramolecular polymer, and the film has a pair of reversible redox potentials.

Embodiment 13

The target ligand is polymerized with $Zn(BF_4)_2 \cdot 6H_2O$ to obtain a metal ion-ligand supramolecular polymer film marked film 3.

66.8 mg (0.1 mmol) of the target ligand prepared in the embodiment 1 and 43.4 mg (0.125 mmol) of $Zn(BF_4)_2 \cdot 6H_2O$ are weighed to dissolve in 100 mL of glacial acetic acid, followed by performing reflux reaction at 80° C. for 36 h, so that the ligand is completely complexed with the metal ion. After the reaction, the filtrate is filtered and evaporated under reduced pressure, and the product is washed with ethanol for many times and then dried in vacuum to obtain 54 mg of solid metallo-supramolecular polymer.

25 mg of the solid metallo-supramolecular polymer is dissolved in 50 ml of methanol, followed by filtering out insoluble substances to obtain a solution, 35 ml of the solution is added into a watering can of a pneumatic pen, and then sprayed on the surface of an ITO conductive glass, and the ITO conductive glass sprayed with the solution is putted in an oven to dry at 38° C. for 24 hours. After methanol volatilizes from the surface of the ITO conductive glass, a uniform metal ion-ligand supramolecular polymer film is obtained, which is marked as the film 3.

The electrochromic performance, cyclic voltammetry performance and electrochromic response time of the obtained film 3 are detected, and the results are similar to those of the embodiment 11. After adding the metal ion, a new absorption peak appeared in the ultraviolet-visible absorption spectrum of the film, which confirms the successful preparation of the metallo-supramolecular polymer, and the film has a pair of reversible redox potentials.

Embodiment 14

The target ligand is polymerized with $RuCl_2$ (DMSO) 4 to obtain a metal ion-ligand supramolecular polymer film marked film 4.

66.8 mg (0.1 mmol) of the target ligand prepared in the embodiment 1 and 63.5 mg (0.13 mmol) of $RuCl_2(DMSO)_4$ are weighed to dissolve in 100 mL of glacial acetic acid, followed by performing reflux reaction at 90° C. for 48 h, so that the ligand is completely complexed with the metal ion. After the reaction, the filtrate is filtered and evaporated under reduced pressure, and the product is washed with ethanol for many times and then dried in vacuum to obtain 65 mg of solid metallo-supramolecular polymer.

25 mg of the solid metallo-supramolecular polymer is dissolved in 50 ml of methanol, followed by filtering out insoluble substances to obtain a solution, 40 ml of the solution is added into a watering can of a pneumatic pen, and then sprayed on the surface of an ITO conductive glass, and the ITO conductive glass sprayed with the solution is putted in an oven to dry at 40° C. for 36 hours. After methanol volatilizes from the surface of the ITO conductive glass, a uniform metal ion-ligand supramolecular polymer film is obtained, which is marked as the film 4.

The electrochromic performance, cyclic voltammetry performance and electrochromic response time of the obtained film 4 are detected, and the results are similar to those of the embodiment 11. After adding the metal ion, a new absorption peak appeared in the ultraviolet-visible absorption spectrum of the film, which confirms the successful preparation of the metallo-supramolecular polymer, and the film has a pair of reversible redox potentials.

Test Example

The solubility of the methanol-supramolecular polymers prepared in the embodiments 11 to 14 is tested. The solution concentrations of different methanol-supramolecular polymers in different solvents are all 2 mg/ml. The results are shown in Table 1.

TABLE 1

Solubility of the metallo-supramolecular polymers prepared in the embodiments 11-14 in six common solvents

| Metallo-supramolecular polymer | Solvent | | | | | |
|---|---|---|---|---|---|---|
| | NMP | DMF | DMSO | $CH_3OH$ | THF | $CHCL_3$ |
| Embodiment 11 | ++ | ++ | + | ++ | -- | ++ |
| Embodiment 12 | ++ | ++ | + | ++ | -- | ++ |
| Embodiment 13 | ++ | ++ | + | ++ | -- | ++ |
| Embodiment 14 | ++ | ++ | + | ++ | +- | ++ |

Note:
++ illustrates soluble at room temperature;
+ illustrates soluble when heated;
+- illustrates partially soluble;
- illustrates insoluble when heated.

The above descriptions are only illustrated embodiments of the disclosure, and it should be noted that for those skilled in the related art, improvements and embellishments can be made without departing from the principles of the disclosure. These improvements and embellishments should also be considered as the scope of the protection of the disclosure.

What is claimed is:

1. A preparation method of a polydentate organic ligand, comprising:
   step 1) under an alkaline condition, performing an Ullmann reaction with bis(4-bromophenyl)amine and an iodobenzene compound, catalyzed by cuprous iodide and 1,10-phenanthroline, to obtain a compound A;
   step 2) under an alkaline condition, performing a Suzuki reaction with the compound A and bis(pinacolto)borane, catalyzed by [1,1'-bis(diphenylphosphino) ferrocene]dichloropalladium (II), to obtain a compound B;
   step 3) under an alkaline condition, performing a Suzuki reaction with the compound B and 2,6-dibromo-4-iodopyridine, catalyzed by tetrakis(triphenylphosphine)palladium, to obtain a compound C;
   step 4) under an alkaline condition, performing a Suzuki reaction with 4-bromo-2h-1,2,3-triazole and bis(pinacolto)borane, catalyzed by [1,1'-bis(diphenylphosphino) ferrocene]dichloropalladium(II), to obtain a compound D; and
   step 5) under an alkaline condition, performing a Suzuki reaction with the compound D and the compound C, catalyzed by tetrakis(triphenylphosphine)palladium, to obtain the polydentate organic ligand;
   wherein the compound A has the following structural formula:

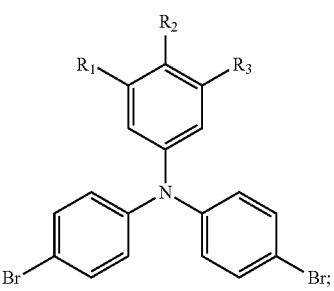

the compound B has the following structural formula:

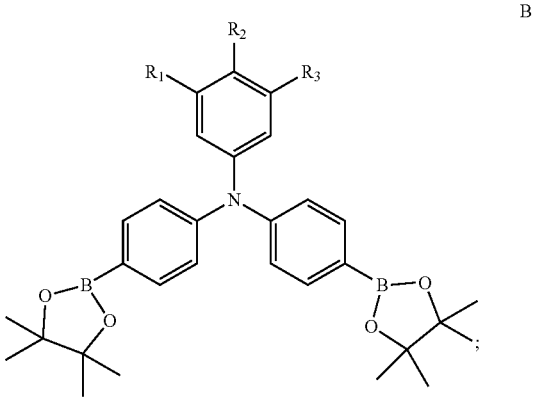

the compound C has the following structural formula:

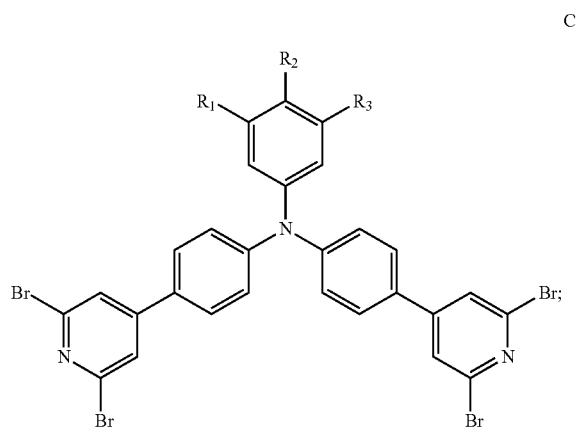

the compound D has the following structural formula:

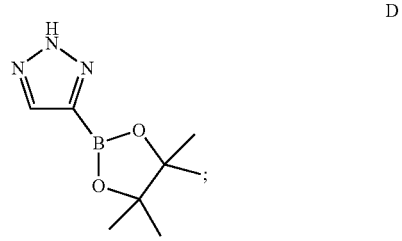

and
wherein $R_1$, $R_2$, and $R_3$ are hydrogen groups (*—H) respectively, and the polydentate organic ligand is expressed by the following structural formula:

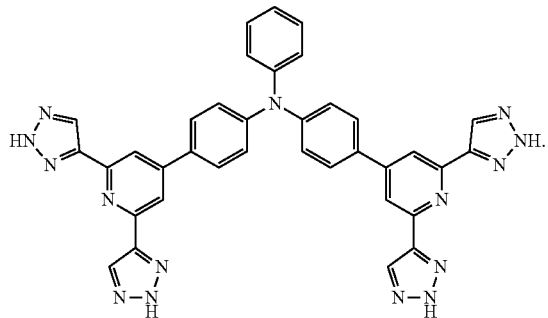 [SMILES: c1ccc(N(c2ccc(-c3cc(-c4cn[nH]n4)nc(-c4cn[nH]n4)c3)cc2)c2ccc(-c3cc(-c4cn[nH]n4)nc(-c4cn[nH]n4)c3)cc2)cc1]

2. The preparation method according to claim 1, wherein in the step 1), an alkali used for the Ullmann reaction is potassium hydroxide, a molar ratio of the bis(4-bromophenyl)amine: the iodobenzene compound: the cuprous iodide: the 1,10-phenanthroline: the potassium hydroxide is 1:1 to 3:0.04 to 0.06:0.04 to 0.06:6 to 10; a temperature of the Ullmann reaction is in a range of 100° C. to 130° C.; and a time of the Ullmann reaction is in a range of 10 h to 40 h.

3. The preparation method according to claim 1, wherein in the step 2), an alkali used for the Suzuki reaction is one selected from the group consisting of potassium acetate, sodium carbonate, lithium carbonate and potassium phosphate; a molar ratio of the compound A: the bis(pinacolto) borane: the alkali: the [1,1'-bis(diphenylphosphino) ferrocene]dichloropalladium (II) is 1:1.5 to 5:6 to 9:0.04 to 0.06; a temperature of the Suzuki reaction is in a range of 80° C. to 100° C.; and a time of the Suzuki reaction is in a range of 12 h to 48 h.

4. The preparation method according to claim 1, wherein in the step 3), an alkali used for the Suzuki reaction is potassium carbonate; a molar ratio of the compound B: the 2,6-dibromo-4-iodopyridine: the tetrakis(triphenylphosphine) palladium: the potassium carbonate is 1:1.5 to 5:0.04 to 0.06:6 to 9; a temperature of the Suzuki reaction is in a range of 50° C. to 80° C.; and a time of the Suzuki reaction is in a range of 18 h to 48 h.

5. The preparation method according to claim 1, wherein in the step 4), an alkali used for the Suzuki reaction is one selected from the group consisting of potassium acetate, sodium carbonate, lithium carbonate and potassium phosphate; a molar ratio of the 4-bromo-2h-1,2,3-triazole: the bis(pinacolto) borane: the alkali: the [1,1'-bis(diphenylphosphino) ferrocene]dichloropalladium (II) is 1:1.5 to 5:6 to 9:0.04 to 0.06; a temperature of the Suzuki reaction is in a range of 80° C. to 100° C.; and a time of the Suzuki reaction is in a range of 12 h to 48 h.

6. The preparation method according to claim 1, wherein in the step 5), an alkali used for the Suzuki reaction is potassium carbonate; a molar ratio of the compound D: the compound C: the tetra(triphenylphosphine) palladium: the potassium carbonate is 1:1.5 to 5:0.04 to 0.06:6 to 9; a temperature of the Suzuki reaction is in a range of 50° C. to 80° C.; and a time of the Suzuki reaction is in a range of 18 h to 48 h.

* * * * *